(12) United States Patent
Kucharewski et al.

(10) Patent No.: US 9,774,560 B2
(45) Date of Patent: *Sep. 26, 2017

(54) PEOPLE LISTS

(75) Inventors: Valerie Kucharewski, San Jose, CA (US); Michael Traylor, Millbrae, CA (US); Michael Anthony Buonomo, Round Hill, VA (US); John Panzer, Mountain View, CA (US); Jack Mazzeo, Santa Clara, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/507,429

(22) Filed: Jun. 28, 2012

(65) Prior Publication Data

US 2013/0013686 A1 Jan. 10, 2013

Related U.S. Application Data

(63) Continuation of application No. 13/048,312, filed on Mar. 15, 2011, now Pat. No. 8,224,916, which is a (Continued)

(51) Int. Cl.
*G06F 15/16* (2006.01)
*G06F 15/173* (2006.01)
(Continued)

(52) U.S. Cl.
CPC .............. *H04L 51/36* (2013.01); *G06Q 10/10* (2013.01); *H04M 1/274533* (2013.01);
(Continued)

(58) Field of Classification Search
CPC ... H04L 12/58; H04L 12/581; H04L 12/5815; H04L 12/585; H04L 12/589;
(Continued)

(56) References Cited

U.S. PATENT DOCUMENTS

| 4,650,927 A | 3/1987 | James |
| 4,817,129 A | 3/1989 | Riskin |

(Continued)

FOREIGN PATENT DOCUMENTS

| CA | 2547240 | 12/2009 |
| CA | 2506417 | 6/2011 |

(Continued)

OTHER PUBLICATIONS

International Search Report of PCT/US03/36654 dated Aug. 17, 2004, 8 pages.

(Continued)

*Primary Examiner* — Farzana Huq
(74) *Attorney, Agent, or Firm* — Keller Jolley Preece

(57) ABSTRACT

Enabling management of contacts includes passively recognizing a set of contacts that are, as a group, repeatedly sent communications by a member, bringing the member's attention to the recognized set of contacts, enabling the member to name the set of contacts, and enabling the member to address future communications to the set of contacts through use of the name associated by the member with the set of contacts.

20 Claims, 7 Drawing Sheets

Related U.S. Application Data continuation of application No. 10/715,215, filed on Nov. 18, 2003, now Pat. No. 7,908,327.

(60) Provisional application No. 60/426,812, filed on Nov. 18, 2002, provisional application No. 60/426,806, filed on Nov. 18, 2002, provisional application No. 60/477,333, filed on Jun. 11, 2003.

(51) Int. Cl.
*H04L 12/58* (2006.01)
*G06Q 10/10* (2012.01)
*H04M 1/2745* (2006.01)
*H04M 3/493* (2006.01)

(52) U.S. Cl.
CPC .... *H04M 3/4931* (2013.01); *H04M 2203/551* (2013.01); *H04M 2203/556* (2013.01)

(58) Field of Classification Search
CPC ............. H04L 12/1813; H04L 12/2496; H04L 1/1628; H04L 29/1215; H04L 63/065
USPC ................................. 709/204–207
See application file for complete search history.

(56) References Cited

U.S. PATENT DOCUMENTS

| | | |
|---|---|---|
| 4,837,798 A | 6/1989 | Cohen et al. |
| 5,008,853 A | 4/1991 | Bly et al. |
| 5,021,949 A | 6/1991 | Morten et al. |
| 5,025,252 A | 6/1991 | DeLuca et al. |
| 5,086,394 A | 2/1992 | Shapira |
| 5,101,424 A | 3/1992 | Clayton et al. |
| 5,276,905 A | 1/1994 | Hurst et al. |
| 5,315,636 A | 5/1994 | Patel |
| 5,329,619 A | 7/1994 | Page et al. |
| 5,351,235 A | 9/1994 | Lahtinen |
| 5,425,028 A | 6/1995 | Bitton et al. |
| 5,436,960 A | 7/1995 | Campana, Jr. et al. |
| 5,438,611 A | 8/1995 | Campana, Jr. et al. |
| 5,440,551 A | 8/1995 | Suzuki |
| 5,448,566 A | 9/1995 | Richter et al. |
| 5,448,567 A | 9/1995 | Dighe et al. |
| 5,459,458 A | 10/1995 | Richardson et al. |
| 5,479,472 A | 12/1995 | Campana, Jr. et al. |
| 5,487,100 A | 1/1996 | Kane |
| 5,491,800 A | 2/1996 | Goldsmith et al. |
| 5,497,463 A | 3/1996 | Stein et al. |
| 5,499,343 A | 3/1996 | Pettus |
| 5,548,637 A | 8/1996 | Heller |
| 5,557,320 A | 9/1996 | Krebs |
| 5,559,949 A | 9/1996 | Reimer et al. |
| 5,561,703 A | 10/1996 | Arledge et al. |
| 5,568,536 A | 10/1996 | Tiller et al. |
| 5,572,643 A | 11/1996 | Judson |
| 5,579,472 A | 11/1996 | Keyworth, II et al. |
| 5,590,133 A | 12/1996 | Bilstrom et al. |
| 5,592,538 A | 1/1997 | Kosowsky et al. |
| 5,604,788 A | 2/1997 | Tett |
| 5,608,786 A | 3/1997 | Gordon |
| 5,615,336 A | 3/1997 | Robson et al. |
| 5,619,648 A | 4/1997 | Canale et al. |
| 5,625,670 A | 4/1997 | Campana, Jr. et al. |
| 5,631,946 A | 5/1997 | Campana, Jr. et al. |
| 5,634,129 A | 5/1997 | Dickinson |
| 5,646,982 A | 7/1997 | Hogan et al. |
| 5,673,308 A | 9/1997 | Akhavan |
| 5,678,179 A | 10/1997 | Turcotte et al. |
| 5,684,494 A | 11/1997 | Nathrath et al. |
| 5,694,616 A | 12/1997 | Johnson |
| 5,697,060 A | 12/1997 | Akahane |
| 5,706,211 A | 1/1998 | Beletic et al. |
| 5,706,501 A | 1/1998 | Horikiri |
| 5,710,884 A | 1/1998 | Dedrick |
| 5,726,984 A | 3/1998 | Kubler et al. |
| 5,737,726 A | 4/1998 | Cameron et al. |
| 5,742,668 A | 4/1998 | Pepe et al. |
| 5,742,905 A | 4/1998 | Pepe et al. |
| 5,749,081 A | 5/1998 | Whiteis et al. |
| 5,760,771 A | 6/1998 | Blonder et al. |
| 5,761,196 A | 6/1998 | Ayerst et al. |
| 5,764,916 A | 6/1998 | Busey et al. |
| 5,771,280 A | 6/1998 | Johnson et al. |
| 5,774,673 A | 6/1998 | Beuk |
| 5,793,365 A | 8/1998 | Tang et al. |
| 5,793,762 A | 8/1998 | Penners et al. |
| 5,796,394 A | 8/1998 | Wicks et al. |
| 5,796,948 A | 8/1998 | Cohen |
| 5,799,157 A | 8/1998 | Escallon |
| 5,799,284 A | 8/1998 | Bourquin |
| 5,802,466 A | 9/1998 | Gallant et al. |
| 5,802,470 A | 9/1998 | Gaulke et al. |
| 5,812,865 A | 9/1998 | Theimer et al. |
| 5,819,084 A | 10/1998 | Shapiro et al. |
| 5,826,025 A | 10/1998 | Gramlich |
| 5,835,089 A | 11/1998 | Skarbo et al. |
| 5,835,722 A | 11/1998 | Bradshaw et al. |
| 5,835,905 A | 11/1998 | Pirolli et al. |
| 5,845,073 A | 12/1998 | Carlin et al. |
| 5,845,300 A | 12/1998 | Comer et al. |
| 5,864,684 A | 1/1999 | Nielsen |
| 5,864,874 A | 1/1999 | Shapiro |
| 5,867,162 A | 2/1999 | O'Leary |
| 5,870,744 A | 2/1999 | Sprague |
| 5,872,521 A | 2/1999 | Lopatukin et al. |
| 5,878,219 A | 3/1999 | Vance, Jr. et al. |
| 5,878,233 A | 3/1999 | Schloss |
| 5,878,397 A | 3/1999 | Stille et al. |
| 5,895,454 A | 4/1999 | Harrington |
| 5,896,321 A | 4/1999 | Miller et al. |
| 5,897,635 A | 4/1999 | Torres |
| 5,903,726 A | 5/1999 | Donovan et al. |
| 5,913,032 A | 6/1999 | Schwartz et al. |
| 5,928,325 A * | 7/1999 | Shaughnessy ....... G06Q 10/107 709/206 |
| 5,933,477 A | 8/1999 | Wu |
| 5,938,725 A | 8/1999 | Hara |
| 5,940,379 A | 8/1999 | Startup et al. |
| 5,940,488 A | 8/1999 | DeGrazia et al. |
| 5,944,791 A | 8/1999 | Scherpbier |
| 5,946,616 A | 8/1999 | Schornack |
| 5,946,617 A | 8/1999 | Portaro et al. |
| 5,946,629 A | 8/1999 | Sawyer et al. |
| 5,946,630 A | 8/1999 | Willars et al. |
| 5,950,193 A | 9/1999 | Kulkarni |
| 5,960,074 A | 9/1999 | Clark |
| 5,960,173 A | 9/1999 | Tang et al. |
| 5,960,429 A | 9/1999 | Peercy et al. |
| 5,961,620 A | 10/1999 | Trent et al. |
| 5,966,663 A | 10/1999 | Gleason |
| 5,970,122 A | 10/1999 | LaPorta et al. |
| 5,974,446 A | 10/1999 | Sonnenreich et al. |
| 5,978,673 A | 11/1999 | Alperovich et al. |
| 5,987,113 A | 11/1999 | James |
| 5,987,376 A | 11/1999 | Olson et al. |
| 5,999,932 A | 12/1999 | Paul |
| 6,006,331 A | 12/1999 | Chu et al. |
| 6,014,429 A | 1/2000 | LaPorta et al. |
| 6,020,884 A | 2/2000 | MacNaughton et al. |
| 6,026,429 A | 2/2000 | Jones et al. |
| 6,028,866 A | 2/2000 | Engel |
| 6,038,451 A | 3/2000 | Syed et al. |
| 6,041,311 A | 3/2000 | Chislenko et al. |
| 6,049,533 A | 4/2000 | Norman et al. |
| 6,064,723 A | 5/2000 | Cohn et al. |
| 6,065,047 A | 5/2000 | Carpenter et al. |
| 6,065,056 A | 5/2000 | Bradshaw et al. |
| 6,067,529 A | 5/2000 | Ray et al. |
| 6,067,561 A | 5/2000 | Dillon |
| 6,073,109 A | 6/2000 | Flores |
| 6,073,138 A | 6/2000 | de l'Etraz |
| 6,076,100 A | 6/2000 | Cottrille et al. |
| 6,081,829 A | 6/2000 | Sidana |

(56) References Cited

U.S. PATENT DOCUMENTS

| | | | |
|---|---|---|---|
| 6,081,830 A | 6/2000 | Schindler | |
| 6,088,435 A | 7/2000 | Barber | |
| 6,091,948 A | 7/2000 | Carr et al. | |
| 6,091,958 A | 7/2000 | Bergkvist et al. | |
| 6,092,049 A | 7/2000 | Chislenko et al. | |
| 6,112,078 A | 8/2000 | Sormunen et al. | |
| 6,112,181 A | 8/2000 | Shear | |
| 6,115,455 A | 9/2000 | Picard | |
| 6,115,605 A | 9/2000 | Siccardo et al. | |
| 6,119,014 A | 9/2000 | Alperovich et al. | |
| 6,128,739 A | 10/2000 | Fleming, III | |
| 6,134,432 A | 10/2000 | Holmes et al. | |
| 6,134,582 A * | 10/2000 | Kennedy | 709/206 |
| 6,138,146 A | 10/2000 | Moon et al. | |
| 6,138,158 A | 10/2000 | Boyle et al. | |
| 6,141,545 A | 10/2000 | Begeja et al. | |
| 6,144,959 A | 11/2000 | Anderson | |
| 6,148,328 A | 11/2000 | Cuomo et al. | |
| 6,148,377 A | 11/2000 | Carter | |
| 6,151,619 A | 11/2000 | Riddle | |
| 6,157,618 A | 12/2000 | Boss et al. | |
| 6,161,129 A | 12/2000 | Rochkind | |
| 6,161,130 A | 12/2000 | Horvitz et al. | |
| 6,167,256 A | 12/2000 | Yla-Outinen | |
| 6,169,911 B1 | 1/2001 | Wagner et al. | |
| 6,175,831 B1 | 1/2001 | Weinreich et al. | |
| 6,175,859 B1 | 1/2001 | Mohler | |
| 6,178,331 B1 | 1/2001 | Holmes et al. | |
| 6,185,603 B1 | 2/2001 | Henderson et al. | |
| 6,189,026 B1 | 2/2001 | Birrell et al. | |
| 6,192,396 B1 | 2/2001 | Kohler | |
| 6,195,354 B1 | 2/2001 | Skalecki et al. | |
| 6,198,738 B1 | 3/2001 | Chang et al. | |
| 6,199,099 B1 | 3/2001 | Gershman et al. | |
| 6,199,103 B1 | 3/2001 | Sakaguchi et al. | |
| 6,208,996 B1 | 3/2001 | Ben-Shachar et al. | |
| 6,212,175 B1 | 4/2001 | Harsch | |
| 6,212,548 B1 | 4/2001 | DeSimone | |
| 6,212,550 B1 | 4/2001 | Segur | |
| 6,223,177 B1 | 4/2001 | Tatham | |
| 6,237,027 B1 | 5/2001 | Namekawa | |
| 6,237,092 B1 | 5/2001 | Hayes, Jr. | |
| 6,243,039 B1 | 6/2001 | Elliot | |
| 6,243,714 B1 | 6/2001 | Shapiro et al. | |
| 6,247,043 B1 * | 6/2001 | Bates et al. | 709/200 |
| 6,252,952 B1 | 6/2001 | Kung et al. | |
| 6,256,516 B1 | 7/2001 | Wagner et al. | |
| 6,259,911 B1 | 7/2001 | Bims et al. | |
| 6,260,148 B1 | 7/2001 | Aggarwal et al. | |
| 6,269,369 B1 | 7/2001 | Robertson | |
| 6,282,435 B1 | 8/2001 | Wagner et al. | |
| 6,292,743 B1 | 9/2001 | Pu et al. | |
| 6,301,609 B1 | 10/2001 | Aravamudan et al. | |
| 6,304,864 B1 | 10/2001 | Liddy et al. | |
| 6,311,211 B1 | 10/2001 | Shaw | |
| 6,324,541 B1 | 11/2001 | de l'Etraz et al. | |
| 6,327,590 B1 | 12/2001 | Chidlovski et al. | |
| 6,330,590 B1 | 12/2001 | Cotten | |
| 6,334,111 B1 | 12/2001 | Carrott | |
| 6,337,712 B1 | 1/2002 | Shiota et al. | |
| 6,343,317 B1 | 1/2002 | Glorikian | |
| 6,347,332 B1 | 2/2002 | Malet | |
| 6,349,299 B1 | 2/2002 | Spencer et al. | |
| 6,351,777 B1 | 2/2002 | Simonoff | |
| 6,360,251 B1 | 3/2002 | Fujita et al. | |
| 6,363,248 B1 | 3/2002 | Silverman | |
| 6,366,907 B1 | 4/2002 | Fanning | |
| 6,374,246 B1 | 4/2002 | Matsuo | |
| 6,374,260 B1 | 4/2002 | Hoffert et al. | |
| 6,374,290 B1 | 4/2002 | Scharber | |
| 6,389,127 B1 | 5/2002 | Vardi et al. | |
| 6,389,372 B1 | 5/2002 | Glance et al. | |
| 6,392,669 B1 | 5/2002 | Matoba et al. | |
| 6,393,464 B1 | 5/2002 | Dieterman | |
| 6,393,465 B2 | 5/2002 | Leeds | |
| 6,396,512 B1 | 5/2002 | Nickerson | |
| 6,404,438 B1 | 6/2002 | Hatlelid | |
| 6,405,035 B1 | 6/2002 | Singh | |
| 6,415,318 B1 | 7/2002 | Aggarwal et al. | |
| 6,421,439 B1 | 7/2002 | Liffick | |
| 6,421,675 B1 | 7/2002 | Ryan | |
| 6,421,709 B1 | 7/2002 | McCormick et al. | |
| 6,423,012 B1 | 7/2002 | Kato et al. | |
| 6,425,012 B1 | 7/2002 | Trovato et al. | |
| 6,430,602 B1 | 8/2002 | Kay et al. | |
| 6,430,604 B1 | 8/2002 | Ogle et al. | |
| 6,434,599 B1 | 8/2002 | Porter | |
| 6,442,589 B1 | 8/2002 | Takahashi et al. | |
| 6,442,591 B1 | 8/2002 | Haynes et al. | |
| 6,446,119 B1 | 9/2002 | Olah et al. | |
| 6,449,344 B1 | 9/2002 | Goldfinger | |
| 6,449,634 B1 | 9/2002 | Capiel | |
| 6,457,044 B1 | 9/2002 | IwaZaki | |
| 6,457,062 B1 | 9/2002 | Pivowar | |
| 6,460,073 B1 | 10/2002 | Asakura | |
| 6,463,464 B1 | 10/2002 | Lazaridis et al. | |
| 6,463,471 B1 | 10/2002 | Dreke et al. | |
| 6,466,918 B1 | 10/2002 | Spiegel et al. | |
| 6,480,885 B1 * | 11/2002 | Olivier | 709/207 |
| 6,483,913 B1 | 11/2002 | Smith | |
| 6,484,196 B1 | 11/2002 | Maurille | |
| 6,487,583 B1 | 11/2002 | Harvey | |
| 6,487,584 B1 | 11/2002 | Bunney | |
| 6,493,703 B1 | 12/2002 | Knight et al. | |
| 6,499,053 B1 | 12/2002 | Marquette | |
| 6,505,167 B1 | 1/2003 | Horvitz et al. | |
| 6,507,866 B1 | 1/2003 | Barchi | |
| 6,512,570 B2 | 1/2003 | Garfinkle et al. | |
| 6,512,930 B2 | 1/2003 | Sandegren | |
| 6,519,629 B2 | 2/2003 | Harvey | |
| 6,519,639 B1 | 2/2003 | Glasser et al. | |
| 6,519,648 B1 | 2/2003 | Eyal | |
| 6,529,903 B2 | 3/2003 | Smith et al. | |
| 6,535,228 B1 | 3/2003 | Bandaru et al. | |
| 6,535,586 B1 | 3/2003 | Cloutier et al. | |
| 6,539,421 B1 | 3/2003 | Appelman et al. | |
| 6,542,500 B1 | 4/2003 | Gerszberg et al. | |
| 6,549,933 B1 | 4/2003 | Barrett et al. | |
| 6,549,937 B1 | 4/2003 | Auerbach et al. | |
| 6,557,027 B1 | 4/2003 | Cragun | |
| 6,564,213 B1 | 5/2003 | Ortega et al. | |
| 6,564,261 B1 | 5/2003 | Gudjonsson et al. | |
| 6,564,264 B1 | 5/2003 | Creswell et al. | |
| 6,567,796 B1 | 5/2003 | Yost et al. | |
| 6,567,807 B1 | 5/2003 | Robles | |
| 6,571,234 B1 | 5/2003 | Knight et al. | |
| 6,583,799 B1 | 6/2003 | Manolis et al. | |
| 6,584,494 B1 | 6/2003 | Manabe et al. | |
| 6,594,673 B1 | 7/2003 | Smith et al. | |
| 6,604,133 B2 | 8/2003 | Aggarwal et al. | |
| 6,606,647 B2 | 8/2003 | Shah et al. | |
| 6,606,657 B1 | 8/2003 | Zilberstein et al. | |
| 6,611,822 B1 | 8/2003 | Beams | |
| 6,615,237 B1 | 9/2003 | Kyne et al. | |
| 6,615,241 B1 | 9/2003 | Miller et al. | |
| 6,618,747 B1 | 9/2003 | Flynn et al. | |
| 6,625,423 B1 | 9/2003 | Wang | |
| 6,628,194 B1 | 9/2003 | Hellebust et al. | |
| 6,633,630 B1 | 10/2003 | Owens et al. | |
| 6,636,733 B1 | 10/2003 | Helferich | |
| 6,636,850 B2 | 10/2003 | Lepien | |
| 6,636,888 B1 | 10/2003 | Bookspan et al. | |
| 6,640,218 B1 | 10/2003 | Golding | |
| 6,640,223 B1 | 10/2003 | Jones et al. | |
| 6,643,641 B1 | 11/2003 | Snyder | |
| 6,643,669 B1 | 11/2003 | Novak et al. | |
| 6,647,259 B1 | 11/2003 | Boyle et al. | |
| 6,647,383 B1 | 11/2003 | August et al. | |
| 6,654,800 B1 | 11/2003 | Rieger, III | |
| 6,658,095 B1 | 12/2003 | Yoakum et al. | |
| 6,658,260 B2 | 12/2003 | Knotts | |
| 6,665,676 B2 | 12/2003 | Twig et al. | |
| 6,665,715 B1 | 12/2003 | Houri | |
| 6,677,968 B1 | 1/2004 | Appelman | |

(56) References Cited

U.S. PATENT DOCUMENTS

| | | | |
|---|---|---|---|
| 6,678,719 B1 * | 1/2004 | Stimmel | 709/204 |
| 6,684,240 B1 | 1/2004 | Goddard | |
| 6,687,362 B1 | 2/2004 | Lindquist et al. | |
| 6,687,739 B2 | 2/2004 | Anupam | |
| 6,687,745 B1 | 2/2004 | Franco et al. | |
| 6,691,162 B1 | 2/2004 | Wick | |
| 6,694,353 B2 | 2/2004 | Sommerer | |
| 6,697,807 B2 | 2/2004 | McGeachie | |
| 6,697,824 B1 | 2/2004 | Bowman-Amuah | |
| 6,697,840 B1 | 2/2004 | Godefroid | |
| 6,699,125 B2 | 3/2004 | Kirmse et al. | |
| 6,701,343 B1 | 3/2004 | Kenyon | |
| 6,701,348 B2 | 3/2004 | Sommerer | |
| 6,701,351 B1 | 3/2004 | Gann | |
| 6,704,727 B1 | 3/2004 | Kravets | |
| 6,708,205 B2 | 3/2004 | Sheldon et al. | |
| 6,711,565 B1 | 3/2004 | Subramaniam et al. | |
| 6,714,519 B2 | 3/2004 | Luzzatti et al. | |
| 6,714,791 B2 | 3/2004 | Friedman | |
| 6,714,793 B1 | 3/2004 | Carey et al. | |
| 6,721,784 B1 | 4/2004 | Leonard et al. | |
| 6,728,357 B2 | 4/2004 | O'Neal et al. | |
| 6,731,308 B1 | 5/2004 | Tang et al. | |
| 6,732,103 B1 | 5/2004 | Strick et al. | |
| 6,732,155 B2 | 5/2004 | Meek | |
| 6,732,185 B1 | 5/2004 | Reistad | |
| 6,750,881 B1 | 6/2004 | Appelman | |
| 6,751,603 B1 | 6/2004 | Bauer et al. | |
| 6,754,904 B1 | 6/2004 | Cooper et al. | |
| 6,757,365 B1 | 6/2004 | Bogard | |
| 6,757,531 B1 | 6/2004 | Haaramo | |
| 6,760,412 B1 | 7/2004 | Loucks | |
| 6,760,580 B2 | 7/2004 | Robinson et al. | |
| 6,760,753 B1 | 7/2004 | Ohgushi et al. | |
| 6,760,754 B1 | 7/2004 | Isaacs et al. | |
| 6,772,188 B1 | 8/2004 | Cloutier | |
| 6,772,196 B1 * | 8/2004 | Kirsch | G06Q 10/107 707/999.005 |
| 6,781,608 B1 | 8/2004 | Crawford | |
| 6,782,414 B1 | 8/2004 | Xue et al. | |
| 6,785,554 B1 | 8/2004 | Amerga | |
| 6,788,769 B1 | 9/2004 | Waites | |
| 6,799,039 B2 | 9/2004 | Wu et al. | |
| 6,800,031 B2 | 10/2004 | Di Cesare | |
| 6,801,659 B1 | 10/2004 | O'Dell | |
| 6,807,562 B1 * | 10/2004 | Pennock et al. | 709/204 |
| 6,816,884 B1 | 11/2004 | Summers | |
| 6,829,607 B1 | 12/2004 | Tafoya et al. | |
| 6,832,245 B1 | 12/2004 | Isaacs et al. | |
| 6,839,554 B2 | 1/2005 | McDowell | |
| 6,839,735 B2 | 1/2005 | Wong et al. | |
| 6,839,737 B1 | 1/2005 | Friskel | |
| 6,848,008 B1 | 1/2005 | Sevanto et al. | |
| 6,848,542 B2 | 2/2005 | Gailey et al. | |
| 6,853,982 B2 | 2/2005 | Smith et al. | |
| 6,854,007 B1 | 2/2005 | Hammond | |
| 6,856,999 B2 | 2/2005 | Flanagin et al. | |
| 6,868,498 B1 | 3/2005 | Katsikas | |
| 6,895,426 B1 | 5/2005 | Cortright et al. | |
| 6,898,626 B2 | 5/2005 | Ohashi | |
| 6,901,398 B1 | 5/2005 | Horvitz et al. | |
| 6,901,559 B1 | 5/2005 | Blum | |
| 6,904,026 B1 | 6/2005 | Tarnanen et al. | |
| 6,907,243 B1 | 6/2005 | Patel | |
| 6,912,505 B2 | 6/2005 | Linden et al. | |
| 6,912,563 B1 | 6/2005 | Parker et al. | |
| 6,912,564 B1 | 6/2005 | Appelman et al. | |
| 6,917,813 B2 | 7/2005 | Elizondo | |
| 6,917,965 B2 | 7/2005 | Gupta et al. | |
| 6,920,478 B2 | 7/2005 | Mendiola et al. | |
| 6,925,469 B2 | 8/2005 | Headings et al. | |
| 6,931,419 B1 | 8/2005 | Lindquist | |
| 6,934,367 B1 | 8/2005 | LaPierre et al. | |
| 6,952,805 B1 | 10/2005 | Tafoya et al. | |
| 6,957,077 B2 | 10/2005 | Dehlin | |
| 6,985,943 B2 | 1/2006 | Deryugin et al. | |
| 6,990,628 B1 | 1/2006 | Palmer et al. | |
| 6,993,325 B1 | 1/2006 | Waesterlid | |
| 6,999,566 B1 | 2/2006 | Eason et al. | |
| 6,999,959 B1 | 2/2006 | Lawrence et al. | |
| 7,003,551 B2 | 2/2006 | Malik | |
| 7,003,794 B2 | 2/2006 | Arye | |
| 7,007,008 B2 | 2/2006 | Goel et al. | |
| 7,007,228 B1 | 2/2006 | Carro | |
| 7,010,312 B1 | 3/2006 | Zechlin | |
| 7,016,978 B2 | 3/2006 | Malik et al. | |
| 7,020,849 B1 | 3/2006 | Chen | |
| 7,031,961 B2 | 4/2006 | Pitkow et al. | |
| 7,032,007 B2 | 4/2006 | Fellenstein et al. | |
| 7,035,865 B2 | 4/2006 | Doss et al. | |
| 7,035,926 B1 | 4/2006 | Cohen | |
| 7,039,639 B2 | 5/2006 | Brezin et al. | |
| 7,054,918 B2 | 5/2006 | Poleyn | |
| 7,056,217 B1 * | 6/2006 | Pelkey et al. | 463/43 |
| 7,058,036 B1 | 6/2006 | Yu et al. | |
| 7,058,690 B2 | 6/2006 | Maehiro | |
| 7,058,892 B1 | 6/2006 | MacNaughton et al. | |
| 7,062,533 B2 | 6/2006 | Brown et al. | |
| 7,065,186 B1 | 6/2006 | Myers et al. | |
| 7,068,769 B1 | 6/2006 | Weaver et al. | |
| 7,076,504 B1 | 7/2006 | Handel | |
| 7,076,546 B1 | 7/2006 | Bates et al. | |
| 7,080,139 B1 | 7/2006 | Briggs et al. | |
| 7,082,407 B1 | 7/2006 | Bezos et al. | |
| 7,089,237 B2 | 8/2006 | Turnbull et al. | |
| 7,089,287 B2 | 8/2006 | Bellotti et al. | |
| 7,092,952 B1 | 8/2006 | Wilens | |
| 7,092,998 B2 | 8/2006 | Frietas | |
| 7,096,009 B2 | 8/2006 | Mousseau et al. | |
| 7,096,030 B2 | 8/2006 | Huomo | |
| 7,096,214 B1 | 8/2006 | Bharat et al. | |
| 7,113,803 B2 | 9/2006 | Dehlin | |
| 7,117,254 B2 | 10/2006 | Lunt et al. | |
| 7,124,123 B1 | 10/2006 | Roskind et al. | |
| 7,127,232 B2 | 10/2006 | O'Neil et al. | |
| 7,130,956 B2 | 10/2006 | Rao | |
| 7,133,506 B1 | 11/2006 | Smith | |
| 7,133,898 B1 | 11/2006 | Malik | |
| 7,136,903 B1 | 11/2006 | Phillips | |
| 7,139,806 B2 | 11/2006 | Hayes et al. | |
| 7,142,642 B2 | 11/2006 | McClelland et al. | |
| 7,146,404 B2 | 12/2006 | Kay et al. | |
| 7,146,416 B1 | 12/2006 | Yoo et al. | |
| 7,162,528 B1 | 1/2007 | Simonoff | |
| 7,177,880 B2 | 2/2007 | Ruvolo | |
| 7,181,498 B2 | 2/2007 | Zhu et al. | |
| 7,185,059 B2 | 2/2007 | Daniell et al. | |
| 7,188,143 B2 | 3/2007 | Szeto | |
| 7,188,153 B2 | 3/2007 | Lunt et al. | |
| 7,190,956 B2 | 3/2007 | Dorenbosch et al. | |
| 7,194,516 B2 | 3/2007 | Giacobbe et al. | |
| 7,200,634 B2 | 4/2007 | Mendiola et al. | |
| 7,203,507 B2 | 4/2007 | Smith et al. | |
| 7,206,814 B2 | 4/2007 | Kirsch | |
| 7,212,617 B2 | 5/2007 | Owens et al. | |
| 7,218,921 B2 | 5/2007 | Mendiola et al. | |
| 7,222,309 B2 | 5/2007 | Chupin et al. | |
| 7,231,428 B2 | 6/2007 | Teague | |
| 7,231,478 B2 | 6/2007 | Leijten | |
| 7,237,002 B1 | 6/2007 | Estrada | |
| 7,237,011 B1 | 6/2007 | St. Pierre | |
| 7,240,093 B1 | 7/2007 | Danieli et al. | |
| 7,246,371 B2 | 7/2007 | Diacakis et al. | |
| 7,257,639 B1 | 8/2007 | Li et al. | |
| 7,269,590 B2 | 9/2007 | Hull et al. | |
| 7,269,627 B2 | 9/2007 | Knauerhase | |
| 7,275,215 B2 | 9/2007 | Werndorfer et al. | |
| 7,284,203 B1 * | 10/2007 | Meeks | G06Q 10/10 709/204 |
| 7,297,110 B2 | 11/2007 | Goyal et al. | |
| 7,299,257 B2 | 11/2007 | Boyer et al. | |
| 7,305,624 B1 | 12/2007 | Siegel | |
| 7,313,760 B2 | 12/2007 | Grossman | |
| 7,319,882 B2 | 1/2008 | Mendiola et al. | |

(56) References Cited

U.S. PATENT DOCUMENTS

| | | | |
|---|---|---|---|
| 7,324,826 B2 | 1/2008 | Carey et al. | |
| 7,337,219 B1 | 2/2008 | Meenan et al. | |
| 7,346,171 B2 * | 3/2008 | Numao | H04L 9/3013 380/286 |
| 7,366,522 B2 | 4/2008 | Thomas | |
| 7,370,035 B2 | 5/2008 | Gross et al. | |
| 7,383,339 B1 | 6/2008 | Meenan et al. | |
| 7,401,098 B2 | 7/2008 | Baker | |
| 7,403,942 B1 | 7/2008 | Bayliss | |
| 7,406,715 B2 | 7/2008 | Clapper | |
| 7,411,939 B1 | 8/2008 | Lamb et al. | |
| 7,424,510 B2 | 9/2008 | Gross et al. | |
| 7,428,580 B2 | 9/2008 | Hullfish et al. | |
| 7,428,585 B1 | 9/2008 | Owens et al. | |
| 7,475,113 B2 | 1/2009 | Stolze | |
| 7,478,414 B1 | 1/2009 | Glusker et al. | |
| 7,499,973 B2 | 3/2009 | Couts et al. | |
| 7,512,407 B2 | 3/2009 | Wu et al. | |
| 7,519,667 B1 * | 4/2009 | Capps | H04L 12/582 709/203 |
| 7,543,243 B2 | 6/2009 | Schwartz et al. | |
| 7,552,460 B2 | 6/2009 | Goldman | |
| 7,590,696 B1 | 9/2009 | Odell | |
| 7,603,417 B2 | 10/2009 | Ben-Yoseph | |
| 7,603,683 B2 | 10/2009 | Reto | |
| 7,613,776 B1 | 11/2009 | Ben-Yoseph | |
| 7,640,306 B2 | 12/2009 | Appelman et al. | |
| 7,653,693 B2 | 1/2010 | Heikes | |
| 7,675,903 B2 | 3/2010 | Ozugur et al. | |
| 7,680,796 B2 | 3/2010 | Yeh et al. | |
| 7,686,693 B2 | 3/2010 | Danieli et al. | |
| 7,716,287 B2 | 5/2010 | Appelman et al. | |
| 7,725,541 B2 | 5/2010 | Daniell et al. | |
| 7,725,542 B2 | 5/2010 | Daniell et al. | |
| 7,752,273 B2 * | 7/2010 | Ito et al. | 709/206 |
| 7,774,410 B2 | 8/2010 | Gang | |
| 7,774,711 B2 | 8/2010 | Valeski | |
| 7,899,862 B2 | 3/2011 | Appelman et al. | |
| 7,908,327 B2 | 3/2011 | Kucharewski | |
| 7,921,368 B2 | 4/2011 | Moody et al. | |
| 8,001,199 B2 | 8/2011 | Appelman | |
| 8,005,919 B2 | 8/2011 | Mehanna | |
| 8,055,675 B2 | 11/2011 | Higgins et al. | |
| 8,117,265 B2 | 2/2012 | Ben-Yoseph | |
| 8,122,137 B2 | 2/2012 | Appelman et al. | |
| 8,150,922 B2 | 4/2012 | Griffin et al. | |
| 8,156,193 B1 | 4/2012 | Odell | |
| 8,167,712 B2 | 5/2012 | Sarkar et al. | |
| 8,224,916 B2 | 7/2012 | Kucharewski | |
| 8,452,849 B2 | 5/2013 | Mehanna | |
| 8,577,972 B1 | 11/2013 | Heikes | |
| 2001/0002469 A1 | 5/2001 | Bates et al. | |
| 2001/0003202 A1 | 6/2001 | Mache et al. | |
| 2001/0003203 A1 | 6/2001 | Mache | |
| 2001/0005861 A1 | 6/2001 | Mousseau et al. | |
| 2001/0013050 A1 | 8/2001 | Shah | |
| 2001/0013069 A1 | 8/2001 | Shah | |
| 2001/0016823 A1 | 8/2001 | Richards et al. | |
| 2001/0018858 A1 | 9/2001 | Dwek | |
| 2001/0025280 A1 | 9/2001 | Mandato et al. | |
| 2001/0034224 A1 | 10/2001 | McDowell et al. | |
| 2001/0048735 A1 | 12/2001 | O'Neal | |
| 2001/0056363 A1 | 12/2001 | Gantz et al. | |
| 2002/0002586 A1 | 1/2002 | Rafal et al. | |
| 2002/0006803 A1 | 1/2002 | Mendiola et al. | |
| 2002/0007398 A1 | 1/2002 | Mendiola et al. | |
| 2002/0013817 A1 * | 1/2002 | Collins | G06Q 10/107 709/206 |
| 2002/0016818 A1 | 2/2002 | Kirani et al. | |
| 2002/0021307 A1 | 2/2002 | Glenn et al. | |
| 2002/0023132 A1 | 2/2002 | Tornabene et al. | |
| 2002/0023147 A1 | 2/2002 | Kovacs et al. | |
| 2002/0029224 A1 | 3/2002 | Carlsson | |
| 2002/0032729 A1 | 3/2002 | Erickson et al. | |
| 2002/0032742 A1 | 3/2002 | Anderson | |
| 2002/0035605 A1 | 3/2002 | McDowell | |
| 2002/0042830 A1 | 4/2002 | Bose et al. | |
| 2002/0046243 A1 | 4/2002 | Morris | |
| 2002/0049610 A1 | 4/2002 | Gropper | |
| 2002/0049704 A1 | 4/2002 | Vanderveldt et al. | |
| 2002/0049751 A1 | 4/2002 | Chen et al. | |
| 2002/0049806 A1 | 4/2002 | Gatz et al. | |
| 2002/0049847 A1 | 4/2002 | McArdle et al. | |
| 2002/0049852 A1 | 4/2002 | Lee et al. | |
| 2002/0052921 A1 | 5/2002 | Morkel | |
| 2002/0054092 A1 | 5/2002 | Hedloy | |
| 2002/0059379 A1 | 5/2002 | Harvey et al. | |
| 2002/0059401 A1 | 5/2002 | Austin | |
| 2002/0059425 A1 | 5/2002 | Belfiore et al. | |
| 2002/0059526 A1 | 5/2002 | Dillon et al. | |
| 2002/0065828 A1 | 5/2002 | Goodspeed | |
| 2002/0065856 A1 | 5/2002 | Kisiel | |
| 2002/0065894 A1 | 5/2002 | Dalal et al. | |
| 2002/0066036 A1 | 5/2002 | Makineni et al. | |
| 2002/0071539 A1 | 6/2002 | Diament et al. | |
| 2002/0078077 A1 | 6/2002 | Baumann et al. | |
| 2002/0083127 A1 | 6/2002 | Agrawal | |
| 2002/0083136 A1 | 6/2002 | Whitten, II | |
| 2002/0084888 A1 | 7/2002 | Jin | |
| 2002/0087630 A1 | 7/2002 | Wu | |
| 2002/0087649 A1 | 7/2002 | Horvitz | |
| 2002/0087704 A1 | 7/2002 | Chesnais et al. | |
| 2002/0091667 A1 | 7/2002 | Jaipuria et al. | |
| 2002/0091936 A1 | 7/2002 | Tema | |
| 2002/0095464 A1 | 7/2002 | Meek | |
| 2002/0095663 A1 | 7/2002 | Joory | |
| 2002/0097856 A1 | 7/2002 | Wullert, II | |
| 2002/0103801 A1 | 8/2002 | Lyons | |
| 2002/0112181 A1 | 8/2002 | Smith | |
| 2002/0112239 A1 | 8/2002 | Goldman | |
| 2002/0116461 A1 | 8/2002 | Diacakis et al. | |
| 2002/0116463 A1 | 8/2002 | Hart | |
| 2002/0116528 A1 | 8/2002 | Vale | |
| 2002/0116641 A1 | 8/2002 | Mastrianni | |
| 2002/0118809 A1 | 8/2002 | Eisenberg | |
| 2002/0119789 A1 | 8/2002 | Friedman | |
| 2002/0120687 A1 | 8/2002 | Diacakis et al. | |
| 2002/0120697 A1 | 8/2002 | Generous et al. | |
| 2002/0120779 A1 | 8/2002 | Teeple et al. | |
| 2002/0123328 A1 | 9/2002 | Snip et al. | |
| 2002/0123988 A1 | 9/2002 | Dean et al. | |
| 2002/0128047 A1 | 9/2002 | Gates | |
| 2002/0130904 A1 | 9/2002 | Becker et al. | |
| 2002/0133369 A1 | 9/2002 | Johnson | |
| 2002/0136390 A1 | 9/2002 | Lang et al. | |
| 2002/0137530 A1 | 9/2002 | Karve | |
| 2002/0138650 A1 | 9/2002 | Yamamoto et al. | |
| 2002/0143565 A1 | 10/2002 | Headings et al. | |
| 2002/0144283 A1 | 10/2002 | Headings et al. | |
| 2002/0151294 A1 | 10/2002 | Kirby et al. | |
| 2002/0154178 A1 | 10/2002 | Barnett | |
| 2002/0155826 A1 | 10/2002 | Robinson et al. | |
| 2002/0160757 A1 | 10/2002 | Shavit et al. | |
| 2002/0160805 A1 | 10/2002 | Laitinen et al. | |
| 2002/0165000 A1 | 11/2002 | Fok | |
| 2002/0165729 A1 | 11/2002 | Keubert et al. | |
| 2002/0169748 A1 | 11/2002 | Macholda | |
| 2002/0174050 A1 | 11/2002 | Eynard | |
| 2002/0174260 A1 | 11/2002 | Huang | |
| 2002/0175953 A1 | 11/2002 | Lin | |
| 2002/0178072 A1 | 11/2002 | Gusler et al. | |
| 2002/0178161 A1 | 11/2002 | Brezin et al. | |
| 2002/0181703 A1 | 12/2002 | Logan et al. | |
| 2002/0184089 A1 | 12/2002 | Tsou et al. | |
| 2002/0184128 A1 | 12/2002 | Holtsinger | |
| 2002/0184309 A1 | 12/2002 | Danker et al. | |
| 2002/0187794 A1 | 12/2002 | Fostick et al. | |
| 2002/0188620 A1 | 12/2002 | Doss et al. | |
| 2002/0194378 A1 | 12/2002 | Foti | |
| 2002/0199095 A1 | 12/2002 | Bandini et al. | |
| 2003/0004855 A1 | 1/2003 | Dutta | |
| 2003/0004872 A1 | 1/2003 | Gardi et al. | |
| 2003/0006912 A1 | 1/2003 | Brescia | |
| 2003/0009385 A1 | 1/2003 | Tucciarone et al. | |

(56) References Cited

U.S. PATENT DOCUMENTS

| | | |
|---|---|---|
| 2003/0009698 A1 | 1/2003 | Lindeman et al. |
| 2003/0014485 A1 | 1/2003 | Banatwala |
| 2003/0018704 A1 | 1/2003 | Polychronidis et al. |
| 2003/0018726 A1 | 1/2003 | Low et al. |
| 2003/0018747 A1 | 1/2003 | Herland et al. |
| 2003/0023681 A1 | 1/2003 | Brown et al. |
| 2003/0023684 A1 | 1/2003 | Brown et al. |
| 2003/0023692 A1 | 1/2003 | Moroo |
| 2003/0023875 A1 | 1/2003 | Hursey |
| 2003/0025824 A1 | 2/2003 | Ishikawa |
| 2003/0028524 A1 | 2/2003 | Keskar |
| 2003/0028595 A1 | 2/2003 | Vogt |
| 2003/0028597 A1 | 2/2003 | Salmi |
| 2003/0028884 A1 | 2/2003 | Swart et al. |
| 2003/0037110 A1 | 2/2003 | Yamamoto |
| 2003/0037112 A1* | 2/2003 | Fitzpatrick .......... H04L 12/1813 709/205 |
| 2003/0037114 A1 | 2/2003 | Nishio et al. |
| 2003/0042306 A1 | 3/2003 | Irwin |
| 2003/0045272 A1 | 3/2003 | Burr |
| 2003/0046097 A1 | 3/2003 | LaSalle et al. |
| 2003/0050916 A1 | 3/2003 | Ortega |
| 2003/0050976 A1 | 3/2003 | Block |
| 2003/0051161 A1 | 3/2003 | Smith et al. |
| 2003/0052915 A1 | 3/2003 | Brown et al. |
| 2003/0054830 A1 | 3/2003 | Williams et al. |
| 2003/0055831 A1 | 3/2003 | Ryan |
| 2003/0055897 A1 | 3/2003 | Brown et al. |
| 2003/0058478 A1 | 3/2003 | Aoki |
| 2003/0060211 A1 | 3/2003 | Chern |
| 2003/0064422 A1 | 4/2003 | McDevitt |
| 2003/0065721 A1* | 4/2003 | Roskind ............... G06Q 10/107 709/204 |
| 2003/0078981 A1 | 4/2003 | Harms et al. |
| 2003/0078987 A1 | 4/2003 | Serebrennikov et al. |
| 2003/0079024 A1 | 4/2003 | Hough et al. |
| 2003/0081001 A1 | 5/2003 | Munro |
| 2003/0083046 A1 | 5/2003 | Mathis |
| 2003/0087632 A1 | 5/2003 | Sagi et al. |
| 2003/0088554 A1 | 5/2003 | Ryan |
| 2003/0101226 A1 | 5/2003 | Quine |
| 2003/0101343 A1 | 5/2003 | Eaton et al. |
| 2003/0105682 A1 | 6/2003 | Dicker et al. |
| 2003/0105820 A1 | 6/2003 | Haims et al. |
| 2003/0105822 A1 | 6/2003 | Gusler et al. |
| 2003/0106054 A1 | 6/2003 | Billmaier et al. |
| 2003/0110056 A1 | 6/2003 | Berghofer |
| 2003/0110212 A1 | 6/2003 | Lewis |
| 2003/0112945 A1 | 6/2003 | Brown et al. |
| 2003/0115585 A1 | 6/2003 | Barsness et al. |
| 2003/0119532 A1 | 6/2003 | Hatch |
| 2003/0119561 A1 | 6/2003 | Hatch et al. |
| 2003/0120732 A1 | 6/2003 | Couts et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0131061 A1 | 7/2003 | Newton |
| 2003/0131143 A1 | 7/2003 | Myers |
| 2003/0135659 A1 | 7/2003 | Bellotti et al. |
| 2003/0154254 A1 | 8/2003 | Awasthi |
| 2003/0154257 A1 | 8/2003 | Hantsch et al. |
| 2003/0154373 A1 | 8/2003 | Shimada et al. |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158860 A1 | 8/2003 | Caughey |
| 2003/0158864 A1 | 8/2003 | Samn |
| 2003/0158902 A1 | 8/2003 | Volach |
| 2003/0167308 A1 | 9/2003 | Schran |
| 2003/0167310 A1 | 9/2003 | Moody et al. |
| 2003/0167324 A1 | 9/2003 | Farnham et al. |
| 2003/0172349 A1 | 9/2003 | Katayama |
| 2003/0174164 A1 | 9/2003 | Capps |
| 2003/0177175 A1 | 9/2003 | Worley et al. |
| 2003/0177190 A1 | 9/2003 | Moody et al. |
| 2003/0179930 A1 | 9/2003 | O'Dell et al. |
| 2003/0185232 A1 | 10/2003 | Moore et al. |
| 2003/0185360 A1 | 10/2003 | Moore et al. |
| 2003/0187813 A1 | 10/2003 | Goldman |
| 2003/0188263 A1 | 10/2003 | Bates et al. |
| 2003/0191673 A1 | 10/2003 | Cohen |
| 2003/0191753 A1 | 10/2003 | Hoch |
| 2003/0191969 A1 | 10/2003 | Katsikas |
| 2003/0196967 A1 | 10/2003 | Robinson et al. |
| 2003/0197729 A1 | 10/2003 | Denoue et al. |
| 2003/0200272 A1 | 10/2003 | Campise et al. |
| 2003/0204568 A1 | 10/2003 | Bhargava et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0208547 A1 | 11/2003 | Branimir |
| 2003/0210265 A1 | 11/2003 | Haimberg |
| 2003/0212745 A1 | 11/2003 | Caughey |
| 2003/0217109 A1 | 11/2003 | Ordille et al. |
| 2003/0220946 A1 | 11/2003 | Malik |
| 2003/0220976 A1 | 11/2003 | Malik |
| 2003/0222902 A1 | 12/2003 | Chupin et al. |
| 2003/0225834 A1 | 12/2003 | Lee et al. |
| 2003/0225836 A1 | 12/2003 | Lee et al. |
| 2003/0225850 A1 | 12/2003 | Teague |
| 2003/0227487 A1 | 12/2003 | Hugh |
| 2003/0227894 A1 | 12/2003 | Wang et al. |
| 2003/0228908 A1 | 12/2003 | Caiafa et al. |
| 2003/0229668 A1 | 12/2003 | Malik |
| 2003/0229717 A1 | 12/2003 | Teague |
| 2003/0229722 A1 | 12/2003 | Beyda |
| 2003/0233265 A1 | 12/2003 | Lee et al. |
| 2003/0233283 A1* | 12/2003 | Shah .................... G06Q 20/10 705/26.41 |
| 2003/0233413 A1 | 12/2003 | Becker |
| 2003/0233416 A1 | 12/2003 | Beyda |
| 2003/0233417 A1 | 12/2003 | Beyda et al. |
| 2003/0233418 A1 | 12/2003 | Goldman |
| 2003/0233650 A1 | 12/2003 | Zaner et al. |
| 2004/0001480 A1 | 1/2004 | Tanigawa et al. |
| 2004/0003041 A1 | 1/2004 | Moore et al. |
| 2004/0003046 A1 | 1/2004 | Grabelsky et al. |
| 2004/0003071 A1 | 1/2004 | Mathew et al. |
| 2004/0005881 A1 | 1/2004 | Ala-Luukko |
| 2004/0010808 A1 | 1/2004 | deCarmo |
| 2004/0017396 A1 | 1/2004 | Werndorfer et al. |
| 2004/0019637 A1 | 1/2004 | Goodman et al. |
| 2004/0019645 A1 | 1/2004 | Goodman et al. |
| 2004/0019650 A1 | 1/2004 | Auvenshine |
| 2004/0019671 A1 | 1/2004 | Metz |
| 2004/0019695 A1 | 1/2004 | Fellenstein et al. |
| 2004/0024478 A1 | 2/2004 | Hans et al. |
| 2004/0024822 A1 | 2/2004 | Werndorfer et al. |
| 2004/0024892 A1* | 2/2004 | Creswell et al. ............... 709/230 |
| 2004/0029567 A1 | 2/2004 | Timmins et al. |
| 2004/0029572 A1 | 2/2004 | Nerot |
| 2004/0030741 A1 | 2/2004 | Wolton et al. |
| 2004/0030750 A1 | 2/2004 | Moore et al. |
| 2004/0030787 A1 | 2/2004 | Jandel |
| 2004/0031058 A1 | 2/2004 | Reisman |
| 2004/0037110 A1 | 2/2004 | Ooishi |
| 2004/0044536 A1 | 3/2004 | Fitzpatrick et al. |
| 2004/0044723 A1 | 3/2004 | Bell et al. |
| 2004/0044736 A1 | 3/2004 | Austin-Lane et al. |
| 2004/0052356 A1 | 3/2004 | McKinzie et al. |
| 2004/0054646 A1 | 3/2004 | Daniell et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell et al. |
| 2004/0056901 A1 | 3/2004 | March et al. |
| 2004/0059708 A1 | 3/2004 | Dean et al. |
| 2004/0059781 A1 | 3/2004 | Yoakum et al. |
| 2004/0059942 A1 | 3/2004 | Xie |
| 2004/0064586 A1 | 4/2004 | Weigand |
| 2004/0073643 A1 | 4/2004 | Hayes et al. |
| 2004/0078440 A1 | 4/2004 | Potter et al. |

(56) References Cited

U.S. PATENT DOCUMENTS

| | | |
|---|---|---|
| 2004/0078445 A1 | 4/2004 | Malik |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0098491 A1 | 5/2004 | Costa-Requena et al. |
| 2004/0103156 A1 | 5/2004 | Quillen et al. |
| 2004/0107119 A1 | 6/2004 | Ohishi |
| 2004/0111261 A1 | 6/2004 | Chaudhari et al. |
| 2004/0117443 A1 | 6/2004 | Barsness |
| 2004/0117451 A1 | 6/2004 | Chung |
| 2004/0117831 A1 | 6/2004 | Ellis et al. |
| 2004/0122681 A1 | 6/2004 | Ruvolo et al. |
| 2004/0122730 A1 | 6/2004 | Tucciarone et al. |
| 2004/0122810 A1 | 6/2004 | Mayer |
| 2004/0122855 A1 | 6/2004 | Ruvolo et al. |
| 2004/0122901 A1 | 6/2004 | Sylvain |
| 2004/0133564 A1 | 7/2004 | Gross et al. |
| 2004/0137882 A1* | 7/2004 | Forsyth ................ 455/414.1 |
| 2004/0141599 A1 | 7/2004 | Tang et al. |
| 2004/0143564 A1 | 7/2004 | Gross et al. |
| 2004/0148347 A1 | 7/2004 | Appelman et al. |
| 2004/0152477 A1 | 8/2004 | Wu et al. |
| 2004/0152517 A1 | 8/2004 | Hardisty et al. |
| 2004/0153506 A1 | 8/2004 | Ito et al. |
| 2004/0153518 A1 | 8/2004 | Seligmann et al. |
| 2004/0154022 A1 | 8/2004 | Boss et al. |
| 2004/0157586 A1 | 8/2004 | Robinson et al. |
| 2004/0162830 A1 | 8/2004 | Shirwadkar et al. |
| 2004/0171396 A1 | 9/2004 | Carey et al. |
| 2004/0172396 A1 | 9/2004 | Vanska |
| 2004/0172481 A1 | 9/2004 | Engstrom |
| 2004/0176076 A1 | 9/2004 | Uppuluri |
| 2004/0176081 A1 | 9/2004 | Bryham et al. |
| 2004/0177119 A1 | 9/2004 | Mason et al. |
| 2004/0179039 A1 | 9/2004 | Blatter et al. |
| 2004/0183829 A1 | 9/2004 | Kontny et al. |
| 2004/0186738 A1 | 9/2004 | Reisman |
| 2004/0186887 A1 | 9/2004 | Galli et al. |
| 2004/0186989 A1 | 9/2004 | Clapper |
| 2004/0193684 A1 | 9/2004 | Ben-Yoseph |
| 2004/0193722 A1 | 9/2004 | Donovan |
| 2004/0196315 A1 | 10/2004 | Swearigen et al. |
| 2004/0198351 A1 | 10/2004 | Knotts |
| 2004/0199581 A1 | 10/2004 | Kucharewski et al. |
| 2004/0199582 A1 | 10/2004 | Kucharewski et al. |
| 2004/0201624 A1 | 10/2004 | Crawford |
| 2004/0203766 A1 | 10/2004 | Jenniges et al. |
| 2004/0204068 A1 | 10/2004 | Komaki |
| 2004/0204140 A1 | 10/2004 | Nagata |
| 2004/0205126 A1 | 10/2004 | Ben-Yoseph |
| 2004/0205127 A1 | 10/2004 | Ben-Yoseph |
| 2004/0210639 A1 | 10/2004 | Ben-Yoseph et al. |
| 2004/0210844 A1 | 10/2004 | Pettinati |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0219936 A1 | 11/2004 | Kontiainen |
| 2004/0220897 A1 | 11/2004 | Bernhart et al. |
| 2004/0221309 A1 | 11/2004 | Zaner |
| 2004/0231003 A1 | 11/2004 | Cooper et al. |
| 2004/0243844 A1 | 12/2004 | Adkins |
| 2004/0255122 A1 | 12/2004 | Ingerman et al. |
| 2004/0267604 A1 | 12/2004 | Gross |
| 2005/0004978 A1 | 1/2005 | Reed et al. |
| 2005/0004984 A1 | 1/2005 | Simpson |
| 2005/0004995 A1 | 1/2005 | Stochosky |
| 2005/0009541 A1 | 1/2005 | Ye et al. |
| 2005/0015432 A1 | 1/2005 | Cohen |
| 2005/0021750 A1 | 1/2005 | Abrams |
| 2005/0021854 A1 | 1/2005 | Bjorkner |
| 2005/0027382 A1 | 2/2005 | Kirmse et al. |
| 2005/0038856 A1 | 2/2005 | Krishnasamy |
| 2005/0050143 A1 | 3/2005 | Guster et al. |
| 2005/0055306 A1 | 3/2005 | Miller et al. |
| 2005/0055340 A1 | 3/2005 | Dresden |
| 2005/0055416 A1 | 3/2005 | Heikes |
| 2005/0066362 A1 | 3/2005 | Rambo |
| 2005/0071251 A1 | 3/2005 | Linden et al. |
| 2005/0076240 A1 | 4/2005 | Appleman |
| 2005/0076241 A1 | 4/2005 | Appelman |
| 2005/0086305 A1 | 4/2005 | Koch et al. |
| 2005/0091314 A1 | 4/2005 | Blagsvedt et al. |
| 2005/0096084 A1 | 5/2005 | Pohja et al. |
| 2005/0102202 A1 | 5/2005 | Linden et al. |
| 2005/0108329 A1 | 5/2005 | Weaver et al. |
| 2005/0108341 A1 | 5/2005 | Matthew et al. |
| 2005/0114229 A1 | 5/2005 | Ackley |
| 2005/0114783 A1 | 5/2005 | Szeto |
| 2005/0125559 A1 | 6/2005 | Mutha |
| 2005/0130633 A1 | 6/2005 | Hill et al. |
| 2005/0149606 A1 | 7/2005 | Lyle et al. |
| 2005/0160144 A1 | 7/2005 | Bhatia |
| 2005/0171955 A1 | 8/2005 | Hull et al. |
| 2005/0172001 A1 | 8/2005 | Zaner et al. |
| 2005/0177486 A1 | 8/2005 | Yeager |
| 2005/0181878 A1 | 8/2005 | Danieli et al. |
| 2005/0187020 A1 | 8/2005 | Amaitis et al. |
| 2005/0188044 A1 | 8/2005 | Fleming, III |
| 2005/0195802 A1 | 9/2005 | Klein et al. |
| 2005/0197846 A1 | 9/2005 | Pezaris |
| 2005/0198131 A1 | 9/2005 | Appelman et al. |
| 2005/0198164 A1 | 9/2005 | Moore et al. |
| 2005/0198172 A1 | 9/2005 | Appelman et al. |
| 2005/0198173 A1 | 9/2005 | Evans |
| 2005/0198268 A1 | 9/2005 | Chandra |
| 2005/0204063 A1 | 9/2005 | O'Brien |
| 2005/0208957 A1 | 9/2005 | Knotts |
| 2005/0216300 A1 | 9/2005 | Appelman et al. |
| 2005/0223075 A1 | 10/2005 | Swearingen et al. |
| 2005/0239550 A1 | 10/2005 | Hardisty et al. |
| 2005/0246420 A1 | 11/2005 | Little |
| 2005/0251515 A1 | 11/2005 | Reed |
| 2005/0289469 A1 | 12/2005 | Chandler et al. |
| 2006/0009243 A1 | 1/2006 | Dahan et al. |
| 2006/0026237 A1 | 2/2006 | Wang et al. |
| 2006/0031080 A1 | 2/2006 | Mallya et al. |
| 2006/0031772 A1 | 2/2006 | Valeski |
| 2006/0036701 A1 | 2/2006 | Bulfer et al. |
| 2006/0047187 A1 | 3/2006 | Goyal et al. |
| 2006/0047747 A1 | 3/2006 | Erickson et al. |
| 2006/0116139 A1 | 6/2006 | Appelman |
| 2006/0117380 A1 | 6/2006 | Tachizawa et al. |
| 2006/0129678 A1 | 6/2006 | Morita |
| 2006/0136584 A1 | 6/2006 | Decker et al. |
| 2006/0149644 A1 | 7/2006 | Sulmar et al. |
| 2006/0154650 A1 | 7/2006 | Sherman et al. |
| 2006/0168204 A1 | 7/2006 | Appelman et al. |
| 2006/0242583 A1 | 10/2006 | MacNaughton et al. |
| 2006/0259344 A1 | 11/2006 | Patel et al. |
| 2006/0259476 A1 | 11/2006 | Kadayam et al. |
| 2006/0271687 A1 | 11/2006 | Alston et al. |
| 2006/0288077 A1 | 12/2006 | Chen et al. |
| 2007/0092072 A1 | 4/2007 | Jacobs |
| 2007/0112966 A1 | 5/2007 | Eftis et al. |
| 2007/0157098 A1 | 7/2007 | Chupin et al. |
| 2007/0185957 A1* | 8/2007 | Mandalia et al. ............ 709/204 |
| 2007/0250566 A1 | 10/2007 | Appelman |
| 2008/0008106 A1* | 1/2008 | Boberg et al. ................ 370/270 |
| 2008/0133417 A1 | 6/2008 | Robinson |
| 2008/0255989 A1 | 10/2008 | Altberg et al. |
| 2008/0288604 A1 | 11/2008 | Major et al. |
| 2009/0016499 A1 | 1/2009 | Hullfish |
| 2009/0043844 A1 | 2/2009 | Zimmet et al. |
| 2009/0070306 A1 | 3/2009 | Stroe |
| 2009/0070433 A1 | 3/2009 | Karstens |
| 2009/0299934 A1 | 12/2009 | Horvitz et al. |
| 2011/0167116 A1 | 7/2011 | Kucharewski |
| 2011/0179117 A1 | 7/2011 | Appelman |
| 2011/0282955 A1 | 11/2011 | Appelman |
| 2012/0011110 A1 | 1/2012 | Mehanna |
| 2012/0198012 A1 | 8/2012 | Odell |
| 2012/0233269 A1 | 9/2012 | Ben-Yoseph |
| 2013/0031638 A1 | 1/2013 | Appelman |
| 2013/0066990 A1 | 3/2013 | Ben-Yoseph |

(56) References Cited

U.S. PATENT DOCUMENTS

| | | |
|---|---|---|
| 2013/0066991 A1 | 3/2013 | Ben-Yoseph |
| 2013/0066992 A1 | 3/2013 | Ben-Yoseph |
| 2013/0067002 A1 | 3/2013 | Heikes |
| 2013/0067003 A1 | 3/2013 | Heikes |
| 2013/0072239 A1 | 3/2013 | Hullfish |
| 2013/0073580 A1 | 3/2013 | Mehanna |
| 2013/0073627 A1 | 3/2013 | Mehanna |
| 2013/0073653 A1 | 3/2013 | Heikes |
| 2013/0073656 A1 | 3/2013 | Hullfish |
| 2013/0073657 A1 | 3/2013 | Hullfish |
| 2013/0073966 A1 | 3/2013 | Appelman |
| 2013/0073967 A1 | 3/2013 | Appelman |
| 2013/0073968 A1 | 3/2013 | Appelman |
| 2013/0080528 A1 | 3/2013 | Mehanna |
| 2013/0097254 A1 | 4/2013 | Appelman |
| 2013/0097255 A1 | 4/2013 | Appelman |
| 2013/0097256 A2 | 4/2013 | Appleman |
| 2013/0117399 A1 | 5/2013 | Appelman |
| 2013/0124506 A1 | 5/2013 | Mehanna |
| 2013/0124629 A1 | 5/2013 | Appelman |
| 2013/0125138 A1 | 5/2013 | Appelman |
| 2013/0132376 A1 | 5/2013 | Mehanna |
| 2013/0138634 A1 | 5/2013 | Mehanna |
| 2013/0138680 A1 | 5/2013 | Mehanna |
| 2013/0144876 A1 | 6/2013 | Mehanna |
| 2013/0144898 A1 | 6/2013 | Mehanna |
| 2013/0145040 A1 | 6/2013 | Mehanna |
| 2013/0151546 A1 | 6/2013 | Mehanna |
| 2013/0159290 A1 | 6/2013 | Mehanna |
| 2013/0159420 A1 | 6/2013 | Appelman |
| 2013/0159439 A1 | 6/2013 | Appelman |
| 2013/0159440 A1 | 6/2013 | Appelman |
| 2013/0159441 A1 | 6/2013 | Appelman |
| 2013/0159442 A1 | 6/2013 | Appelman |
| 2013/0173722 A1 | 7/2013 | Kucharewski |
| 2013/0174060 A1 | 7/2013 | Odell |

FOREIGN PATENT DOCUMENTS

| | | |
|---|---|---|
| CN | 1348296 | 5/2002 |
| CN | 100476805 | 4/2009 |
| DE | 10048653 | 4/2002 |
| EP | 0889660 | 1/1999 |
| EP | 1011243 | 6/2000 |
| EP | 1054329 | 11/2000 |
| EP | 1071295 | 1/2001 |
| EP | 1091532 | 4/2001 |
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| EP | 1565845 | 8/2008 |
| GB | 2328835 | 3/1999 |
| GB | 2357932 | 7/2001 |
| GB | 2368747 | 5/2002 |
| JP | 2004-86950 | 3/1992 |
| JP | 2008-123821 | 5/1996 |
| JP | 2009-247334 | 9/1997 |
| JP | 2011-161682 | 6/1999 |
| JP | 2011-328194 | 11/1999 |
| JP | 2000-148795 | 5/2000 |
| JP | 2000-222424 | 8/2000 |
| JP | 2002-7479 | 1/2002 |
| JP | 2001-109752 | 4/2002 |
| JP | 2002-132832 | 5/2002 |
| JP | 2002-175301 | 6/2002 |
| KR | 20011048800 | 6/2001 |
| KR | 1020010012984 | 9/2002 |
| WO | WO 97/34244 | 9/1997 |
| WO | WO 97/37303 | 10/1997 |
| WO | WO 98/20410 | 5/1998 |
| WO | WO 98/47270 | 10/1998 |
| WO | WO 99/34628 | 7/1999 |
| WO | WO 00/10099 | 2/2000 |
| WO | WO 00/42791 | 7/2000 |
| WO | WO 00/43892 | 7/2000 |
| WO | WO 00/47270 | 8/2000 |
| WO | WO 00/79396 | 12/2000 |
| WO | WO 01/06748 | 1/2001 |
| WO | WO 01/40957 | 6/2001 |
| WO | WO 01/41477 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/80079 | 10/2001 |
| WO | WO 02/03216 | 1/2002 |
| WO | WO 02/19643 | 3/2002 |
| WO | WO 02/28046 | 4/2002 |
| WO | WO 02/073886 | 9/2002 |
| WO | WO 02/077840 | 10/2002 |
| WO | WO 02/093400 | 11/2002 |
| WO | WO 02/093875 | 11/2002 |
| WO | WO 03/021929 | 3/2003 |
| WO | WO 2006/026908 | 3/2003 |
| WO | WO 2004/046875 | 6/2004 |
| WO | WO 2004/046949 | 6/2004 |
| WO | WO 2004/046970 | 6/2004 |
| WO | WO 2004/088943 | 10/2004 |
| WO | WO 2004/111812 | 12/2004 |
| WO | WO 2004/111871 | 12/2004 |
| WO | WO 2005/010709 | 2/2005 |
| WO | WO 2005/054991 | 6/2005 |
| WO | WO 2005/057329 | 6/2005 |
| WO | WO 2005/086723 | 9/2005 |
| WO | WO 2005/089286 | 9/2005 |
| WO | WO 2006/066092 | 6/2006 |
| WO | WO 2006/068955 | 6/2006 |

OTHER PUBLICATIONS

Office Action, U.S. Appl. No. 10/715,214, dated Apr. 20, 2007, 41 pages.
Kyungkoo Jun, et al., "Agent-Based Resource Discovery", IEEE(2000), 10 pages.
"Creating a Single List of Contacts—Google Scholar" available at http://scholar.google.com/scholar?hl=en&lr= &q=creating+a+single+list+list+of+contacts&as_ . . . (Mar. 27, 2007), 10 pages.
Office Action, U.S. Appl. No. 10/715,214, dated Oct. 9, 2007, 24 pages.
European Search Report, European Application No. 03781972.9-2201, dated Feb. 8, 2008, 5 pages.
Tang, John et al., "ConNexus to Awarenex: Extending awareness to mobile users", Sun Microsystems Laboratories, SIGCHI 2001, ACM 1-58113-327, Mar. 31-Apr. 5 2001, ACM vol. 3. Iss.1 pp. 221-228.
U.S. Appl. No. 10/715,213, filed Nov. 18, 2003, Schlegel.
U.S. Appl. No. 10/974,969, filed Oct. 28, 2004, Wick.
U.S. Appl. No. 11/023,652, filed Dec. 29, 2004, Odell.
U.S. Appl. No. 13/361,141, filed Jan. 30, 2012, Appelman et al.
U.S. Appl. No. 13/617,270, filed Sep. 14, 2012, Appelman.
U.S. Appl. No. 13/617,330, filed Sep. 14, 2012, Appelman.
U.S. Appl. No. 13/617,350, filed Sep. 14, 2012, Appelman.
U.S. Appl. No. 13/619,036, filed Sep. 14, 2012, Heikes.
U.S. Appl. No. 13/619,054, filed Sep. 14, 2012, Heikes.
U.S. Appl. No. 13/620,862, filed Sep. 15, 2012, Appelman et al.
U.S. Appl. No. 13/620,863, filed Sep. 15, 2012, Appelman et al.

(56) References Cited

OTHER PUBLICATIONS

U.S. Appl. No. 13/620,865, filed Sep. 15, 2012, Appelman et al.
Automated feature of Internet Explorer, www.geocities.com/technofundo/tech/web/ie_autocomplete.html, pp. 1-6, Feb. 18, 2004.
"Approved Database for KnockKnock," http://www.knockmail.com/support/appdatabase.html, pp. 1, as accessed on Dec. 4, 2003.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
AE. Milewski et al., "Providing Presence Cues to Telephone Users", Proceedings of CSCW 2000, ACM Conference on Computer Supported Cooperative Work, Jan. 2000, INSPEC p. 3.
America Online Growing Pains, Newsbytes, Mar. 7, 1995.
Armstrong, R., et al., "Web Watcher: a learning apprentice for the world wide web," Feb. 1, 1995,7 pages.
ATMobile Develops Networking-Sensing Instant Messaging, Dec. 8, 1999, Newsbytes, pp. 1-2.
"A Countermeasure to Duplicate-detecting Anti-spam Techniques," Robert J. Hall, AT&T Labs Technical Report 99.9.1, May 1999, Abst. and pp. 1-26.
Adeptra Services Overview; Nov. 7, 2002; adeptra.com ; pp. 1-7.
Adeptra, Features; Nov. 27, 2002; adeptra.com ; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"Better Bayesian Filtering," Paul Graham, Jan. 2003, pp. 1-11, http:// www.paulgraham.com/better.html.
B. Raman et al., "Universal Inbox-Providing Extensible Personal Mobility and Service Mobility in an Integrated Communication Network", Proceedings Third IEEE Workshop on Mobile Computing Systems and Applications, Oct. 2000, INSPEC p. 7.
Brown et al., "WWW Plug-Ins Companion," Que Corporation, Oct. 1996, pp. 351-362.
Business Information Corporation, Sep. 1, 1999, Atmobile.com Enters 'IM' World.
Business Wire Atmobile Corporation, AtMobile awarded U.S. Patent Covering Key Elements of its Wireless Instant Messaging System, Sep. 13, 1999.
Boyce, Jim, "Microsoft Office Outlook 2003 Inside Out," Microsoft Press (published Nov. 12, 2003), pp. 252.
Brugali, David, "Mediating the Internet," Annals of Software Engineering, vol. 13, pp. 285-308, Jun. 2002, Kluwer Academic Publishers, The Netherlands.
Bryan Pfaffenberger, Netscape Navigator Gold, AP Professional, Jan. 1997, 4 pages.
Cerulean Studios, "Trillian Pro: No Boundaries," (Overview, New Features, Tech Specs, Corporate, Product Tour—16 pages) 1999-2004; first release Jul. 2000.
Cerulean Studios, "Trillian Pro: Your Freedom to Chat," (Overview, Features, Screenshots, Tech Specs—8 total pages) 1999-2004; first release Jul. 2000.
Chen, Hao et al. "Bringing Order to the Web: Automatically Categorizing Search Results." Proceedings of the SIGCHI conference on human factors in computing systems. ACM Press. pp. 145-152. New York, Jan. 2000.
Chung-Hwa Herman Rao et al.; iMobile: A Proxy-Based Platform for Mobile Services; Network Services Research Center AT&T Labs-Research, Aug. 2001.
Chung-Hwa- Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
CommWorks 8250 Personal Communications Management System; Dec. 11, 2002; commworks.com; pp. 1-2.
CommWorks IP Messaging; Dec. 11, 2002; commworks.com; pp. 1-2.
"CrushParty.com: Help," retrieved Jun. 12, 2002 from the World Wide Web: http://www.crushparty.com/help.jsp, 3 pages.
CNET Networks Inc., "PopUp Killer", Sep. 13, 2001, Internet: download. cnet.com/downloads/O-10059-100-6932612 shtml, (3 pages).
Convergys Interactive Alerts Reduce Customer Care Costs and Improve Customer Satisfaction; convergys.com ; pp. 1-2, Jan. 22, 2002.
"Digital Artifacts for Remembering and Storytelling: Post History and Social Network Fragments," Viegas et al., retrieved from the World Wide Web: http://we.media.mit.edu/-fviegas/papers/posthistory.snfpdf, (10 pages), Jan. 2004.
Danny Sullivan, "What People Search for," Search Engine Watch, pp. 1-4, http://searchenginewatch.com/facts/searches.html (visited Feb. 13, 2003).
"Degrees of Separation Email Spam Protection", Halfbakery: Degrees of Separation Email Spam Protection, reprinted from http://halfbakery.com/idea/Degrees-20 of-20Separation-20Email-20Spam-20Protecti . . . printed on Mar. 1, 2004 (3 pages).
"Denied Database for KnockKnock," http://www.knockmail coml support/denydatabase.html, pp. 1, as accessed on Dec. 4, 2003.
"Email Server Control for KnockKnock," http://www.knockmail.com/supporUemailservcont,html, pp. 1-2, as accessed on Dec. 4, 2003.
Ed Bott and Ron Person, UsingWindows 95 with Internet Explorer 4.0, Feb. 17, 1998, Que, Special Edition, (21 pages).
"Finding Others Online: Reputation Systems for Social Online Spaces," Jensen et al., Apr. 20-25, 2002, CHI, Minneapolis, Minnesota, vol. 4, Issue 1, pp. 447-454.
Global Solutions Directory; Nov. 7, 2002; softwaresibm.com ; pp. 1-5.
Google Zeitgeist—Search patterns, trends, and surprises according to Google, Jan. 2003, pp. 1-2, http://www.google.com/press/zeitgeist.html (visited Feb. 13, 2003).
G. Held, "Instant Messaging Finds its Voice", Network Magazine, May 2001, INSPEC p. 5.
G. Reif et al.; A Web-based Peer-to-Peer Architecture for Collaborative Nomadic Working; Technical University of Vienna, Distributed Systems Group, Jun. 20, 2000.
Gross et al., "Computer-Supported Cooperative Work and the Internet," IEEE, Sep. 1996, 00. pp. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
Hubbub: a sound enhanced mobile instant messenger that supports awareness and opportunistic interactions, Issacs, E. and Walendowski A.m and Ranganathanm D., Proceedings of the SIGCHI conference on Human Factors in computing systems: Changing our world, changing ourselves, pp. 179-186, Apr. 2002, ACM Press New York, NY, USA.
Hottie or Nottie? Web Site Voters Let You Know WhetherYou Sizzle or Fizzle, Marino, Jul. 11, 2001, Florida Times Union, p. C.1. (2 total pages).
Home-tribe.net, http://washingtondc stribe meUmessage/24434dlb-817b-4580 -aa42 -3bffal5 f26a?page=1 , (4 pages), printed from Internet Dec. 13, 2004, message dated Oct. 19, 2003.
http://www.friendster.com, (17 pages), Dec. 2004.
http://www.knockrnail.com/support/newsettings.jpg, as accessed on Dec. 4. 2003.
"Icq.anywhere, Email Features—Email Center—ICQ.com," retrieved Apr. 29, 2004 from the World Wide Web: http://www.icq.com/email/popular-features.html, pp. 1-5.
Ion Adroutsopoulos et al., "Learning to Filter Spam E-Mail: A Comparison of a Naive Bayesian and a Memory-Based Approach", University of Athens, Jun. 2000, pp. 1-12.

(56) References Cited

OTHER PUBLICATIONS

Ipipi Frequently Asked Questions; Nov. 6, 2002; ipipi.com; pp. 1-2.
Ignite Software: Parent Tools Feature Set, "Parent Tools Features," http://www.parent-tools.com/features.htm, Ignite Software, pp. 1-3, as accessed on Dec. 10, 2003.
ICQ 99a, "Welcome to ICQ version 99a", XP-002163918, ICQ Inc., Nov. 1998.
"Instant Messaging is Everyone's Business," Yahoo Business Messenger, Yahoo!, Mar. 2003.
IBM Lotus Software, Sametime Everyplace FAQ Overview Information, pp. 1-3, http://www.lotus.com/products/wireless.nsf/allpublic . . . , (visted Jul. 28, 2003).
IBM Lotus Software, Sametime Everyplace Wireless Collaboration that's Fit for e-Business, pp. 1-6, http://www.lotus.com/products.wireless.nsf/allpublic . . . , (visited Jul. 28, 2003).
IM Means Business IEEE Spectrum, Nov. 2002.
imForwards.com—FAQ's; Oct. 21, 2003.
Index of /tarvizo/oldfiles/elips/tnt-2.4, Jul. 2, 2001, TNT, http://web.mit.edu/tarvizo/oldfiles/elips/tnt-2.4/.
Instant messaging in teen life, Grinter, R.E. and Palen, L., Proceedings of the 2002 ACM conference on Computer supported cooperative work, pp. 21-30, Nov. 2002, ACM Press, New York, NY, USA.
Instant Messaging with Mobile Phones to Support Awareness, Mitsuoka, M. and Watanabe, S. and Kakuta, J. and Okuyama, S., pp. 223-230, Jan. 2001, IEEE.
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOlpatt.html?acbmn1+0 &adxnnlx=107029 . . . , printed on Nov. 5, 2004 (2 pages).
"Instant Messaging for Gamers," PC Gamer, May 2004, vol. 11, No. 5, (2 pages).
J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.
J. Dudley, "Telstra targets Net spammers", news.com.au , Dec. 2, 2003.
Jabber, Inc., Jabber Wireless Gateway Overview, May 2001.
"Jabber" http://www.jabber.com/index.cgi?CONTENTID=9, as accessed on Dec. 4, 2003.
Jennifer B. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, available at http://www.wired.com/culture/lifestyle/news/2003/11/61227?currentPage=al.
Jonathan B Postel, "Simple Mail Transfer Protocol", RFC788, Information Science Institute, Nov. 1981.
Julian Byrne, "My Spamblock was thrwarting UCE address culling programs", news.admin.net-abuse.e-mail, Jan. 19, 1997.
"Knock Settings ServersTab," http://www.knockmail.com/support/advserverset.html, pp. 1-2, as accessed on Dec. 4, 2003.
Komatsu et al., "Text Input with Dynamic Abbreviation Expansion," IPSJ SIG Notes, vol. 2001, No. 87, Sep. 14, 2008, pp. 133-138, in Japanese with a partial English Translation.
Kirk Scott, Ubique's Virtual Places: Communication and interaction on the World Wide Web, 1 page, http://www.w3.org/collabroation/workshop/proceedings/p2.html, (visited Jul. 28, 2003).
Laliberte et al., "A Protocol for Scalable Group and Public Annotations," Elsevier, Apr. 1995, pp. 911-918.
Leander Kahney, "Will You Buy a Car From This Man?", Oct. 6, 2003, pp. 1-3, available at http://www.wired.com/techbizlmedia/news/2003/10/60703.
"Learning Spam: Simple Techniques for Freely-Available Software," Bart Massey et ai, Computer Science Dept., Portland, OR USA, Apr. 2003, pp. 1-14.

"Lotus Instant Messaging Everyplace FAQ," retrieved Apr. 29, 2004 from the World Wide Web: http://www.lotus.com/products/product4nsf/wdocs/249c6f083166cd3e85256d7300714407, (3 pages).
Lieberman, H., "Letizia: An Agent that Assists Web Browsing", Aug. 20, 1995, pp. 924-929.
"Listsery Control for KnockKnock," http://www.knockmail com/supporUlistservcont.html, pp. 1, as accessed on Dec. 4, 2003.
Luis Felipe Cabrera et al., "Herald: Achieving a Global Event NotificationService", Microsoft Research, May 2001.
M. Castelluccio, "E-mail in Real Time", Strategic Finance, Sep. 1999, INSPEC p. 10.
M. Day, S Aggarwal, G Mohr, J. Vincent, RFC 2279 Instant Messaging/Presence Protocol Requirements, Feb. 2000.
M. Meola et al., "Real-Time Reference Service for the Remote User: From the Telephone and Electronic Mail to Internet Chat, Instant Messaging and Collaborative Software", Reference Librarian, Dec. 1999, INSPEC p. 8.
M. Smith et al.; Conversation Trees and Threaded Chats; Collaboration & Multimedia Group, Microsoft Research, Redmond, WA, Feb. 2000.
"Managing your Addresses in Knockmail," http://www.knockmail.com/supporUmanaddresses.html, pp. 1-2, as accessed on Dec. 4, 2003.
McMurray, Susan, "Shield your children from unsuitable Internet content," http://www.microsoft.com/canada/home/internet&security/2.4.8protectwithparentalcontrolshowtosafeguardyourcomputer.asp#, Microsoft Home Magazine, pp. 1-3, as accessed on Dec. 10, 2003.
Mark Handel et al., "TeamPortal: Providing Team Awareness on the Web", Dec. 2000.
McKendrick, Joseph; "Internet Call Centers: New Era in Customer Service", Feb. 2002; VIO, n2, (4 pages).
Microservices: CommWorks Find Me—Follow Me Application; Dec. 11, 2002; commworks.com; pp. 1-2.
Microservices: CommWorks Message Alert System; Dec. 11, 2002; commworks.com; pp. 1-3.
Microservices: CommWorks Message Delivery System; Dec. 11, 2002; commworks.com; pp. 1-2.
Microsoft PressPass; Nov. 7, 2002; microsoft.com ; pp. 1-9.
Mobile instant messaging through Hubbub, Issacs, E. and Walendowski, A. and Ranganathan, D., Communications of the ACM, vol. 45, No. 9, pp. 68-72, Sep. 2002, ACM Press New York, NY USA.
Midorikawa, et al., "Part 2 Build up a Comfortable Search Environment via Customization by Rules," PC Japan, vol. 7, No. 10, pp. 172-176, in Japanese with a partial English Translation of p. 172, Nov. 2002.
Mozilla, www.mozilla.org/projects/ml/autocomplete, Mar. 13, 2003.
Moore, J. "AOL's Grand Goal; America Online seeks to transform itself into a major Internet player," Information Week, Jul. 31, 1995, lines 7-23, pp. 38-42.
N. Liew Kwek Sing; AOL ICQ vs. MSN Messenger; Department of Electronic and Computer Science, University of Southampton, Mar. 2003.
Nardi, BA, Whittaker, S. and Bradner, E., Feb. 2000. Interaction and Outeraction: instant messaging in Action. In Proceedings of the 2000 ACM Conference on Computer Supported Cooperative Work (Philadelphia, Pennsylvannia, USA.) CSCW '00. ACM New York, NY, 79-88.
Nextel Announces On-Line Paging Service Provided by Wireless Services—First Wireless Telephone Messaging Service to Offer Delivery Confirmation, Aug. 12, 1998, NY.
Net Alerts Overview; Nov. 7, 2002; microsoft.com ; pp. 1-3.
Neo Mai, Ken Neo. "Buying and selling on the internet; [Computimes, 2* Edition]." New Straits Times. Kuala Lumpur: Jun. 28, 2001. p. 53.
Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep. 17, 2004 the whole document.

(56) References Cited

OTHER PUBLICATIONS

Olsen, Stefanie, "Will instant messaging become instant spamming?,". http://news.com.com/2100-1023-252765.html?legacy=cnet, Feb. 16, 2001, pp. 1-4.
Ozmosys Enterprise; Nov. 7, 2002; ozmosys.com ; pp. 1-3.
"Pending Database for KnockKnock," http://www.knockmail coml support/penddatabase.html, pp. 1, as accessed on Dec. 4, 2003.
"Preview Pending Emails in KnockMail," http://www.knockmail.com/supporUpreviewemail.html, pp. 1-2, as accessed on Dec. 4, 2003.
"Protect Your Privacy," MSN Features, http://messenger.msn.com/Feature/Privacy.aspx, as accessed on Dec. 2, 2003.
Parviainen et al., "Mobile Instant Messaging", Jul. 3, 2003 IEEE.
Patrice Godefroid et al., "Ensuring Privacy in Presence Awareness Systems: An Automated Verification Approach". Feb. 2000.
Paul Mutton, "PieSpy Social Network Bot-Inferring and Visualizing Social Networks on IRC", jibble.org, http://lister.linux-srv.anlx.net/piespy, © 2001-2004, pp. 1-18, Mar. 18, 2004.
Per E. Pedersen et al.; Using the Theory of Planned Behavior to Explain Teenager's Adoption of Text Messaging Services; Agder University College, Jun. 2002.
Per E. Pedersen; The Adoption of Text Messaging services among Norwegian Teens: Development and Test of an Extended Adoption Model; SNF-Report No. 23/02; Samfunns-Og Naeringslivsforskning as Bergen, Jun. 2002.
Phillips Business Information corporation—Aug. 23, 1999—Instant messaging has emerged as one of the most popular communication mediums in the world.
Prodigy Launches 100 Interest Groups on the World Wide Web; All Sites Have Deep Links to Chat and Newsgroups; Topics Range from "Adventure Travel" and "Astrology" to "Virtual Reality" and "Wrestling", Business Wire, Sep. 27, 1995, 4 Pages.
"Plaxo—Update Your Address Book," Plaxo Contact Networks, reprinted from http://web.archive.org/web/20030218233638/http://www.plaxo.com printed on Nov. 5, 2004 (available on Feb. 18, 2003), (1 page).
"Plaxo", Plaxo, reprinted from http://web.archive.org/web/20041105072256/http://www.plaxo.com/ printed on Nov. 5, 2004 (available on Feb. 14, 2004) (2 pages).
Parent Tools TheUltimate in Monitoring and Controlling AIM
"Parent Tools for AIM," http://www.parent-tools.com/screenshots.htm, pp. 1-4, as accessed on Dec. 10, 2003.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim//Webmessenger-RIM-J2ME-Instant -Messaging-20 . . . , pp. 1-4.
"Reflections on Friendster, Trust and Intimacy," Danah Boyd, Ubicomp 2003, Workshop Application for the Intimate Ubiquitous Computing Workshop. Seattle, WA, Oct. 12-15, 2003, (4 pages).
R. Movva & W. Lai, "MSN Messenger Service 1.0 Protocol", Aug. 1999, Internet Draft, http://toolsietf.org/id/draft-movva-msn-messenger-protocol-oo.bct, 28 pages.
Reichard, K., "AOL, ICO to Interoperate-But in a Limited Fashion," Oct. 30, 2002, InstantMessagingPlanet, available at www.instantmessagingplanet.com/public/articie.php/1490771.
Ryze home page, www.ryze.com , Dec. 21, 2003, available at http://web.archivesorg/web/20031221010006/http://ryze .com, printed Mar. 16, 2005, 13 pages.
R. Droms, "Dynamic Host Configuration Protocol", Network Working Group, Oct. 1993.
Richard S. Hall, "The Event Desktop: Supporting Event-Enabled Clients on the Web", Freie University, Berlin. Retrieved on May 21, 2013.
Roscheisen et al., "Beyond Browsing: Shared Comments, SOAPs, Trails, and On-line Communities," Elsevier, Apr. 1995, pp. 739-749.
S. Okuyana et al., "New Mobile Service Based on Instant Messaging Technology", Fujitsu, Apr. 2001, INSPEC p. 1.
S. Ortiz, Jr., "Instant Messaging: No Longer Just Chat", Computer, Mar. 2001, INSPEC p. 6.
Schulzrinne, H.; Rosenberg J., "The Session Initiation Protocol: Internet-centric signaling," Communications Magazine, IEEE, vo. 38, No. 10, pp. 134-141, Oct. 2000.
SproWuest Wireless Instant messaging (Nov. 22, 1999) InfoSpace.com, pp. 1-2.
"Six Degrees—New Programs Help Companies 'Mine Workers' Relationships for Key Business Prospects," William M. Bulkeley et al., Marketplace, The Wall Street Journal, Apr. 4, 2003, (3 pages).
SM Cherry "Talk is Cheap, Text is Cheaper" (IEEE Spectrum May 2003).
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com , (36 pages).
"Support Vector Machines for Spam, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).
Solutions Smartdelivery; Nov. 6, 2002; centerpost.com ; pp. 1-2.
"SurfControl Instant Message Filter," Instant Message Filter, SurfControl pic. Apr. 2003.
"Spammers Target Instant Message Users," http://www.bizreport.com/article.php?art id=5507 Nov. 13, 2003, pp. 1-4.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"SVM-based Filtering of E-mail Spam with Content-specific Misclassification Costs," Aleksander Kolcz et al., TextDM '2001 (IEEE ICDM—2001 Workshop on Text Mining); San Jose, CA, 2001, pp. 1-14, Nov. 2001.
The Wall Street Journal article "Esniff Ferrets Out Misbehavior by 'Reading' E-Mail, Web Visits," Katherine Lange, interactive.wsj.com, Apr. 27, 2001, Tech Q&A.
The Early Report—The Early Show segment, "Big Brother in the Corner Office," Julie Chen, cbsnews.com/earlyshow/caught/techage/20001228esniff.shtml, Dec. 28, 2000: Tech Age.
"The first Social Software . . . a true Social Adventure," Huminity—Social Networking, Chat Software, Create Personal Free Blogs and My Group . . . , reprinted from http://www.huminity.com/ printed on Nov. 5, 2004 (2 pages).
"The eSniff Product Overview," eSniff: Define Your e-Boundaries, www.esniff.com/product overview.html, May 15, 2001.
"Text Categorization with Support Vector Machines: Learning with Many Relevant Features," Thorsten Joachims, University of Dortmund, Computer Science Dept., LS-8 Report 23, 1998, (18 paqes), Nov. 27, 1997, revised Apr. 19, 1998.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).

(56) References Cited

OTHER PUBLICATIONS

"Technology Journal: Changing Chat—Instant Messaging is Taking Off, and for Some Users It's Nuzzling Out the Phone," Nick Wingfield, Asian WSJ, Sep. 2000, (5 pages).
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"Technical Solutions for Controlling Spam," Shane Hird, Proceedings of Aug. 2002, Melbourne, Sep. 4-6, 2002, (17 pages).
Tara Hall, Lotus Developer Domain, "Same Place, Sametime with Chris Price", pp. 1-8, http://www.10.lotus.com/ldd/today.nsf/DisplayForm/ . . . , (Visited Jul. 28, 2003), Sep. 2002.
Teraitech; Nov. 7, 2002; teraitech.com ; 1 page.
Uhara7, "Re. being invisible to all but one person on your list", alt.chat-programs.icq, Feb. 29, 2000.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Upside, About Our Product; upsideweb.com ; pp. 1-5, Nov. 2002.
V, Vittore, "The Next Dial Tone? [instant messaging]", Telephony, Oct. 16, 2000, INSPEC p. 8.
VisiblePath webpages, www.visiblepath.org , Dec. 3, 2003, available at http://web. archive.org/web/20031203132211/http://www.visiblepath.com, printed Mar. 16, 2005, 5 pages.
Walther, M., "Supporting Development of Synchronous Collaboration Tools on the Web with GroCo," Feb. 2-9, 1996, pp. 1-6.
Way-bac machine, handspring treo 270, Jun. 1, 2002.
"Wireless Instant Messaging Solution . . . " Newswire, NY Dec. 8, 1999 Atmobile corp, pp. 1-2.
WebleySystems; CommuniKate Unified Communications Features List; Dec. 11, 2002; webley.com; pp. 1-3.
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
WebmasterWorld.com Inc., "HTML and Browsers", Mar. 5, 2001, Internet: www.webmaster.com/forum21/637.htm, (2 pages).
www.yahoo.com, Yahoo! Messenger for Text Messaging, Jul. 2002.
Yiva Hard af Segerstad et al.; Awareness of Presence, Instant Messaging and WebWho; Department of Linguistic, Goteborg University; Sweden, Dec. 2000.
Yahoo! Buzz Index, Feb. 13, 2003, 1 page, http://buzz.yahoo.com/overall/.
Yahoo! Buzz Index, Nov. 10, 2002, 1 page.
Yahoo! Messenger, "Messenger Help," (4 total pages) Nov. 2002.
ZeroDegrees home page, www.zerodegrees.com , Jan. 24, 2004, available at http://web.archive.org/web/20040204153037/www.zerodegrees.com/home.htm, printed Mar. 16, 2005, 2 pages.
Zephyr on Athena (AC-34), http://web.mit.edu/olh//Zephyr/Revision.html, 11 pages, Retrieved on May 17, 2013.
Notification of Transmittal of the International Search Report and the Written Opinion of the International Searching Authority for International Application No. PCT/US2004/029291; Dec. 27, 2005; 9 pages.
English translation of an Office Action issued in corresponding Japanese Application No. 2004-570418 on Aug. 7, 2008.
English translation of an Office Action issued in corresponding Japanese Application No. 2004-570418 on Feb. 5, 2009.
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (3 pages).
International Search Report issued in International Application No. EP03731244, dated Aug. 30, 2005, (4 pages).
Supplementary European Search Report issued in European Application No. EP05728303, dated Jan. 9, 2009, (4 pages).
Supplementary European Search Report issued in European Application No. 05857099.5-1238/1836596, PCT/US2005045663, dated Nov. 7, 2008, (5 pages).
International Search Report, PCT/US03/36656, dated Apr. 22, 2004.
Supplementary European Search Report dated Jun. 7, 2006 for Application No. EP 03811631, 3 pages.
Notification of Transmittal of the International Search Report or the Declaration dated Jun. 23, 2004 for International Application Serial No. PCT/US03/36795.
Office Action issued in Chinese Application No. 200480013443.9, mailed Mar. 6, 2009, 20 pages, including English translation.
Office Action mailed Apr. 21, 2005 for European Application No. 97946924.4-1238, 6 pages.
Office Action mailed May 21, 2008 for European Application No. 97946924.4-1238, 10 pages.
International Search Report and Written Opinion for International Application No. PCT/US05/45630, Dated Oct. 23, 2006.
International Search Report dated Jan. 27, 2005 for International Application No. PCT US2004/009422, International Filing Date Mar. 26, 2004.
International Search Report issued in International Application No. PCT/US03/36795 mailed Jun. 23, 2004, 9 Pages.
International Search Report mailed Dec. 27, 2005 for International Application No. PCT/US2004/29291, filed Sep. 8, 2004.
International Search Report, Application Serial No. PCT/US04/23382, dated Feb. 1, 2007, 12 pages.
International Standard, Information technology—telecommunications and information exchange between systems—private integrated services network—specifications, functional model and information flows—Short message service, ISO/IEC21989, Jul. 1, 2002.
European Office Communication issued in Application No. EP 97946924.4-1238 mailed Apr. 5, 2007, 7 pages.
European Oral Proceedings issued in Application No. EP 97946924.4-1238 mailed Feb. 6, 2007, 9 pages.
European Oral Proceedings issued in Application No. EP 97946924.4-1238 mailed Oct 7, 2007, 8 pages.
European Office Action, Application Serial No. 03 811 631.5-2201, dated Oct. 4, 2006, 4 pages.
European Search Report, Application No. EP 03811631, dated Jun. 23, 2006, 5 pages.
Office Action from the Canadian Intellectual Property Office in corresponding Canadian Application No. 2,506,417, dated Aug. 14, 2007, 3 pages.
Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
U.S. Appl. No. 10/146,814, Dec. 11, 2006, Office Action.
U.S. Appl. No. 10/146,814, Jul. 2, 2007, Office Action.
U.S. Appl. No. 10/184,002, Jan. 9, 2007, Office Action.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/334,056, Oct. 30, 2008, Office Action.
U.S. Appl. No. 10/633,636, Oct. 11, 2006, Office Action.
U.S. Appl. No. 10/651,303, Feb. 9, 2007, Office Action.
U.S. Appl. No. 10/651,303, Apr. 28, 2008, Office Action.
U.S. Appl. No. 10/651,303, Oct. 8, 2008, Office Action.
U.S. Appl. No. 10/651,303, May 1, 2009, Office Action.
U.S. Appl. No. 10/651,303, Nov. 27, 2009, Office Action.
U.S. Appl. No. 10/651,303, Mar. 11, 2011, Notice of Allowance.
U.S. Appl. No. 10/715,206, Sep. 27, 2007, Office Action.
U.S. Appl. No. 10/715,206, Jul. 25, 2008, Notice of Allowance.
U.S. Appl. No. 10/715,206, Jan. 27, 2009, Office Action.

(56) References Cited

OTHER PUBLICATIONS

U.S. Appl. No. 10/715,206, Aug. 13, 2009, Notice of Allowance.
U.S. Appl. No. 10/715,210, Sep. 27, 2007, Office Action.
U.S. Appl. No. 10/715,210, Apr. 14, 2008, Office Action.
U.S. Appl. No. 10/715,210, May 13, 2009, Office Action.
U.S. Appl. No. 10/715,210, Mar. 29, 2010, Notice of Allowance.
U.S. Appl. No. 10/715,211, Jan. 8, 2008, Office Action.
U.S. Appl. No. 10/715,211, Jul. 11, 2008, Office Action.
U.S. Appl. No. 10/715,211, Nov. 28, 2008, Office Action.
U.S. Appl. No. 10/715,211, Jun. 24, 2009, Office Action.
U.S. Appl. No. 10/715,211, Oct. 2, 2009, Notice of Allowance.
U.S. Appl. No. 10/715,211, Feb. 3, 2010, Office Action.
U.S. Appl. No. 10/715,211, Jul. 14, 2010, Office Action.
U.S. Appl. No. 10/715,211, Oct. 25, 2010, Notice of Allowance.
U.S. Appl. No. 10/715,213, Apr. 26, 2007, Office Action.
U.S. Appl. No. 10/715,213, Oct. 22, 2007, Office Action.
U.S. Appl. No. 10/715,213, Aug. 7, 2008, Office Action.
U.S. Appl. No. 10/715,213, Feb. 5, 2009, Office Action.
U.S. Appl. No. 10/715,213, Aug. 6, 2009, Office Action.
U.S. Appl. No. 10/715,213, Jul. 18, 2013, Office Action.
U.S. Appl. No. 10/715,215, Mar. 23, 2007, Office Action.
U.S. Appl. No. 10/715,215, Aug. 20, 2007, Office Action.
U.S. Appl. No. 10/715,215, Nov. 20, 2010, Notice of Allowance.
U.S. Appl. No. 10/715,216, Feb. 12, 2007, Office Action.
U.S. Appl. No. 10/715,216, Jan. 11, 2008, Office Action.
U.S. Appl. No. 10/715,216, Aug. 18, 2009, Office Action.
U.S. Appl. No. 10/723,040, Mar. 14, 2006, Office Action.
U.S. Appl. No. 10/723,040, Jun. 26, 2006, Office Action.
U.S. Appl. No. 10/723,040, Jan. 4, 2007, Office Action.
U.S. Appl. No. 10/723,040, Jun. 4 , 2007, Office Action.
U.S. Appl. No. 10/723,040, Oct. 25, 2007, Office Action.
U.S. Appl. No. 10/723,040, May 21, 2008, Notice of Allowance.
U.S. Appl. No. 10/746,230, Mar. 17, 2009, Office Action.
U.S. Appl. No. 10/746,232, Mar. 18, 2009, Office Action.
U.S. Appl. No. 10/747,263, Mar. 5, 2008, Office Action.
U.S. Appl. No. 10/747,263, Sep. 5, 2008, Office Action.
U.S. Appl. No. 10/747,263, Feb. 11, 2009, Notice of Allowance.
U.S. Appl. No. 10/747,263, Jun. 2, 2009, Notice of Allowance.
U.S. Appl. No. 10/747,651, Mar. 5, 2008, Office Action.
U.S. Appl. No. 10/747,651, Feb. 20, 2009, Office Action.
U.S. Appl. No. 10/747,676, Sep. 21, 2007, Office Action.
U.S. Appl. No. 10/747,676, Mar. 31, 2008, Office Action.
U.S. Appl. No. 10/747,678, Sep. 14, 2007, Office Action.
U.S. Appl. No. 10/747,678, Mar. 27, 2008, Office Action.
U.S. Appl. No. 10/747,678, Jun. 12, 2008, Office Action.
U.S. Appl. No. 10/747,678, Dec. 15, 2008, Office Action.
U.S. Appl. No. 10/747,678, Jun. 5, 2009, Notice of Allowance.
U.S. Appl. No. 10/747,678, Jun. 19, 2009, Notice of Allowance.
U.S. Appl. No. 10/747,682, Oct. 11, 2007, Office Action.
U.S. Appl. No. 10/747,682, Apr. 7, 2008, Office Action.
U.S. Appl. No. 10/747,682, Aug. 19, 2008, Office Action.
U.S. Appl. No. 10/747,682, Mar. 18, 2009, Office Action.
U.S. Appl. No. 10/747,682, Nov. 2, 2009, Office Action.
U.S. Appl. No. 10/747,682, Jun. 11, 2010, Office Action.
U.S. Appl. No. 10/747,682, Dec. 2, 2010, Office Action.
U.S. Appl. No. 10/747,682, Oct. 5, 2011, Notice of Allowance.
U.S. Appl. No. 10/825,617, Jun. 24, 2008, Office Action.
U.S. Appl. No. 10/825,617, Mar. 9, 2009, Notice of Allowance.
U.S. Appl. No. 10/825,617, Sep. 10, 2009, Notice of Allowance.
U.S. Appl. No. 10/895,421, Jan. 9, 2007, Office Action.
U.S. Appl. No. 10/895,421, Jun. 27, 2007, Office Action.
U.S. Appl. No. 10/895,421, Apr. 16, 2008, Office Action.
U.S. Appl. No. 10/895,421, Nov. 19, 2008, Notice of Allowance.
U.S. Appl. No. 10/895,421, Apr. 17, 2009, Notice of Allowance.
U.S. Appl. No. 10/974,969, Mar. 17, 2008, Office Action.
U.S. Appl. No. 10/974,969, Mar. 6, 2009, Office Action.
U.S. Appl. No. 10/974,969, Sep. 8, 2009, Notice of Allowance.
U.S. Appl. No. 10/981,460, Aug. 20, 2008, Office Action.
U.S. Appl. No. 11/015,423, Mar. 2, 2009, Office Action.
U.S. Appl. No. 11/015,424, Mar. 19, 2008, Office Action.
U.S. Appl. No. 11/015,424, May 1, 2009, Office Action.
U.S. Appl. No. 11/015,476, Mar. 2, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/023,652, Aug. 30, 2010, Office Action.
U.S. Appl. No. 11/023,652, May 12, 2011, Office Action.
U.S. Appl. No. 11/023,652, Dec. 8, 2011, Office Action.
U.S. Appl. No. 11/023,652, Sep. 24, 2012, Office Action.
U.S. Appl. No. 11/023,652, Oct. 25, 2013, Office Action.
U.S. Appl. No. 11/079,522, Oct. 16, 2008, Office Action.
U.S. Appl. No. 11/079,522, Apr. 3, 2009, Office Action.
U.S. Appl. No. 11/237,718, Apr. 2, 2009, Office Action.
U.S. Appl. No. 11/408,166, Mar. 18, 2009, Office Action.
U.S. Appl. No. 11/408,166, Oct. 7, 2009, Office Action.
U.S. Appl. No. 11/408,166, Sep. 2, 2010, Office Action.
U.S. Appl. No. 11/408,166, Apr. 13, 2011, Office Action.
U.S. Appl. No. 11/408,166, Oct. 17, 2011, Office Action.
U.S. Appl. No. 11/464,816, Apr. 21, 2009, Office Action.
U.S. Appl. No. 11/574,831, Sep. 18, 2009, Office Action.
U.S. Appl. No. 11/574,831, May 16, 2010, Office Action.
U.S. Appl. No. 11/574,831, Sep. 9, 2010, Office Action.
U.S. Appl. No. 11/574,831, Apr. 15, 2011, Office Action.
U.S. Appl. No. 11/574,831, Oct. 13, 2011, Notice of Allowance.
U.S. Appl. No. 12/236,255, Apr. 2, 2010, Office Action.
U.S. Appl. No. 12/236,255, Sep. 17, 2010, Office Action.
U.S. Appl. No. 12/236,255, Feb. 3, 2011, Office Action.
U.S. Appl. No. 12/548,338, Nov. 9, 2010, Office Action.
U.S. Appl. No. 12/548,338, May 19, 2011, Office Action.
U.S. Appl. No. 12/548,338, Dec. 9, 2011, Notice of Allowance.
U.S. Appl. No. 12/626,099, Sep. 17, 2010, Office Action.
U.S. Appl. No. 12/626,099, Mar. 30, 2011, Notice of Allowance.
U.S. Appl. No. 12/689,699, Feb. 28, 2011, Office Action.
U.S. Appl. No. 12/689,699, Apr. 23, 2012, Office Action.
U.S. Appl. No. 12/689,699, Oct. 9, 2012, Notice of Allowance.
U.S. Appl. No. 12/689,699, Mar. 11, 2013, Office Action.
U.S. Appl. No. 12/689,699, Jun. 18, 2013, Notice of Allowance.
U.S. Appl. No. 13/023,256, Jun. 21, 2011, Office Action.
U.S. Appl. No. 13/023,256, Nov. 28, 2011, Office Action.
U.S. Appl. No. 13/023,256, Apr. 16, 2012, Office Action.
U.S. Appl. No. 13/023,256, Sep. 28, 2012, Office Action.
U.S. Appl. No. 13/023,256, Jun. 21, 2013, Office Action.
U.S. Appl. No. 13/023,256, Nov. 7, 2013, Office Action.
U.S. Appl. No. 13/048,312, Nov. 22, 2011, Office Action.
U.S. Appl. No. 13/048,312, Mar. 13, 2012, Notice of Allowance.
U.S. Appl. No. 13/184,414, Aug. 17, 2012, Notice of Allowance.
U.S. Appl. No. 13/184,414, Nov. 28, 2012, Notice of Allowance.
U.S. Appl. No. 13/184,414, Jan. 29, 2013, Notice of Allowance.
U.S. Appl. No. 13/189,972, Oct. 29, 2013, Office Action.
U.S. Appl. No. 13/189,972, Jul. 24, 2013, Office Action.
U.S. Appl. No. 13/189,972, Dec. 21, 2012, Office Action.
U.S. Appl. No. 13/189,972, Aug. 22, 2012, Notice of Allowance.
U.S. Appl. No. 13/189,972, May 7, 2012, Office Action.
U.S. Appl. No. 13/189,972, Jan. 5, 2012, Office Action.
U.S. Appl. No. 13/189,972, Sep. 2, 2011, Office Action.
U.S. Appl. No. 13/372,371, May 9, 2013, Office Action.
U.S. Appl. No. 13/614,640, Oct. 2, 2013, Office Action.
U.S. Appl. No. 13/614,781, Jun. 4, 2013, Office Action.
U.S. Appl. No. 13/614,781, Sep. 12, 2013, Office Action.
U.S. Appl. No. 13/617,270, Sep. 12, 2013, Office Action.
U.S. Appl. No. 13/617,330, Sep. 12, 2013, Office Action.
U.S. Appl. No. 13/619,009, Mar. 7, 2013, Office Action.
U.S. Appl. No. 13/619,009, Sep. 19, 2013, Office Action.
U.S. Appl. No. 13/619,036, Mar. 26, 2013, Office Action.
U.S. Appl. No. 13/619,036, Sep. 16, 2013, Office Action.
U.S. Appl. No. 13/619,054, Mar. 26, 2013, Office Action.
U.S. Appl. No. 13/619,054, Oct. 10, 2013, Office Action.
U.S. Appl. No. 13/620,851, Feb. 8, 2013, Office Action.
U.S. Appl. No. 13/620,853, Feb. 13, 2013, Office Action.
U.S. Appl. No. 13/620,856, Feb. 13, 2013, Office Action.
U.S. Appl. No. 13/361,141, Mar. 19, 2013, Office Action.
U.S. Appl. No. 13/361,141, Aug. 15, 2013, Office Action.
U.S. Appl. No. 13/729,318, Sep. 18, 2013, Office Action.
U.S. Appl. No. 13/755,990, Oct. 2, 2013, Office Action.

(56) References Cited

OTHER PUBLICATIONS

U.S. Appl. No. 13/766,775, Sep. 19, 2013, Office Action.
U.S. Appl. No. 13/766,779, Oct. 15, 2013, Office Action.
U.S. Appl. No. 10/715,213, Dec. 6, 2013, Notice of Allowance.
U.S. Appl. No. 11/023,652, Apr. 29, 2014, Office Action.
U.S. Appl. No. 13/189,972, Apr. 21, 2014, Office Action.
U.S. Appl. No. 13/372,371, Nov. 29, 2013, Office Action.
U.S. Appl. No. 13/372,371, Mar. 26, 2014, Office Action.
U.S. Appl. No. 13/372,371, Jul. 1, 2014, Notice of Allowance.
U.S. Appl. No. 13/442,226, Apr. 14, 2014, Office Action.
U.S. Appl. No. 13/614,640, Jan. 31, 2014, Office Action.
U.S. Appl. No. 13/614,640, Jun. 11, 2014, Notice of Allowance.
U.S. Appl. No. 13/617,270, Apr. 10, 2014, Office Action.
U.S. Appl. No. 13/617,330, Apr. 8, 2014, Office Action.
U.S. Appl. No. 13/617,350, Mar. 27, 2014, Office Action.
U.S. Appl. No. 13/619,009, Mar. 12, 2014, Notice of Allowance.
U.S. Appl. No. 13/619,009, Apr. 11, 2014, Notice of Allowance.
U.S. Appl. No. 13/619,036, Mar. 21, 2014, Office Action.
U.S. Appl. No. 13/619,054, Apr. 7, 2014, Office Action.
U.S. Appl. No. 13/620,851, Nov. 29, 2013, Office Action.
U.S. Appl. No. 13/620,851, Apr. 8, 2014, Office Action.
U.S. Appl. No. 13/620,853, Jan. 9, 2014, Office Action.
U.S. Appl. No. 13/620,856, Jan. 9, 2014, Office Action.
U.S. Appl. No. 13/620,862, Jul. 24, 2014, Office Action.
U.S. Appl. No. 13/361,141, Jan. 17, 2014, Office Action.
U.S. Appl. No. 13/729,318, Feb. 5. 2014, Office Action.
U.S. Appl. No. 13/731,124, Dec. 6, 2013, Office Action.
U.S. Appl. No. 13/731,124, Jun. 30, 2014, Office Action.
U.S. Appl. No. 13/755,990, Jan. 29, 2014, Office Action.
U.S. Appl. No. 13/755,990, May 16, 2014, Notice of Allowance.
U.S. Appl. No. 13/766,775, Mar. 24, 2014, Office Action.
U.S. Appl. No. 13/766,781, Nov. 17, 2013, Office Action.
U.S. Appl. No. 13/766,781, May 6, 2014, Office Action.
U.S. Appl. No. 13/766,785, Nov. 29, 2013, Office Action.
U.S. Appl. No. 13/766,785, May 14, 2014, Office Action.
U.S. Appl. No. 13/766,786, Nov. 27, 2013, Office Action.
U.S. Appl. No. 13/766,786, May 8, 2014, Office Action.
U.S. Appl. No. 13/766,779, Apr. 11, 2014, Office Action.
U.S. Appl. No. 13/614,781, Dec. 26, 2013, Office Action.
U.S. Appl. No. 13/614,781, Apr. 2, 2014, Office Action.
U.S. Appl. No. 13/620,863, Aug. 1, 2014, Office Action.
U.S. Appl. No. 13/620,865, Aug. 6, 2014, Office Action.
U.S. Appl. No. 13/616,750, May 7, 2015, Office Action.
U.S. Appl. No. 13/616,750, Jan. 20, 2016, Office Action.
U.S. Appl. No. 13/616,750, Jan. 25, 2017, Notice of Allowance.
U.S. Appl. No. 15/608,891, filed Aug. 11, 2017, Office Action.

* cited by examiner

PEOPLE LISTS

CROSS REFERENCE TO RELATED APPLICATIONS

This is a continuation of application Ser. No. 13/048,312, filed on Mar. 15, 2011 now U.S. Pat. No. 8,224,916 (now allowed), which is a continuation of application Ser. No. 10/715,215, filed Nov. 18, 2003 (now U.S. Pat. No. 7,908,327), which claims the benefit of U.S. Provisional Application No. 60/426,812, filed Nov. 18, 2002, and titled "People Sharing: Groups/Lists/Rostering," and claims the benefit of U.S. Provisional Application No. 60/426,806, filed Nov. 18, 2002, and titled "Software Enabling and Enhancing Communications and Functionality At A Client Computer," and claims the benefit of U.S. Provisional Application No. 60/477,333, filed Jun. 11, 2003, and titled "People Lists," all of which are incorporated by reference in their entireties.

TECHNICAL FIELD

This document relates to the identification and creation of lists of contacts to which electronic messages may be sent from one or more communications applications.

BACKGROUND

Many activities that leverage the Internet involve communicating and sharing messages (a.k.a., sending messages). Multiple communications programs may be used to send messages over the Internet. For example, separate applications exist for sending e-mail messages, instant messages, digital pictures, and electronic calendar information. These different applications may be used to send messages to common people or common groups of people. However, conventionally, each application typically stores a separate list of people or groups of people with whom communication using that application regularly occurs. For example, an e-mail application has an address book, and an instant messaging application has a buddy list.

SUMMARY

In one general aspect, enabling management of contacts includes passively recognizing a set of contacts that are, as a group, repeatedly sent communications by a member, bringing the member's attention to the recognized set of contacts, enabling the member to name the set of contacts, and enabling the member to address future communications to the set of contacts through use of the name associated by the member with the set of contacts.

Implementation may include one or more of the following features. For example, in one implementation, passively recognizing the set of contacts may include storing communications sent by the member during a period of time, examining the communications sent by the member during the period of time, and identifying a set of contacts that was sent at least a minimum number of communications by the member during the period of time.

In another implementation, passively recognizing the set of contacts may include storing a predetermined number of communications sent by the member, examining the predetermined number of communications sent by the member, and identifying a set of contacts that was sent at least a minimum number of communications out of the predetermined number of communications by the member.

The member may be enabled to accept or to reject the recognized set of contacts brought to the member's attention. The member may be enabled to delay a rejected set of contacts from being brought to the member's attention. The member may be enabled to assign a unique identifier to the set of contacts.

In one implementation, the communications sent to the set of contacts and the future communications may be sent from multiple applications.

The multiple applications may include communications applications. The communications applications may include an e-mail application and at least one application other than an e-mail application. The communications applications may include an instant messaging application and at least one application other than an instant messaging application. The communications applications may include a digital image sharing application and at least one application other than a digital image sharing application. The communications applications may include an alerting application that sends alerts and reminders to users and at least one application other than an alerting application that sends alerts and reminders to users. The communications applications may include an application for sharing and exchanging contact information and at least one application other than an application for sharing and exchanging contact information.

The multiple applications may include other sharing applications. The other sharing applications may include an electronic journal application and at least one application other than an electronic journal application. The other sharing applications may include an e-mail filtering application and at least one application other than an e-mail filtering application. The other sharing applications may include an application that enables the specification of parental controls over a child account and at least one application other than an application that enables the specification of parental controls over a child account.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings may indicate like elements.

DETAILED DESCRIPTION

People lists are lists of contacts, for example, with each contact stored in a people list as a single identifier. The single identifier may be an e-mail address, a screen name, a cell phone number, or any other identifier capable of uniquely identifying the corresponding contact. A people list may be accessed from a central people list repository by multiple applications to address messages. For example, an e-mail application may use a people list to specify the recipients of an e-mail message and a digital image sharing application may use the same people list to specify the recipients of a shared digital image.

People lists may be actively created through the specification of a single identifier for each of the contacts to be included in the people list. People lists also may be created passively through automatic detection of a set of contacts that are repeatedly specified as the recipients of messages, where the set of contacts repeatedly receiving messages include the members of a passively created people list. People lists also may be created through the integration of existing lists from within the multiple applications into the set of people lists. For example, distinct people lists may be created based on each of the named groups within a buddy list of an instant messaging application.

Once created, people lists may be shared to prevent the need for duplicate creation of a people list for use by multiple people. The person who originally creates the people list shares the people list by sending copies to each of the people with whom the list is to be shared. If any of the people holding a copy of the people list makes any changes to the people list, the changes may be automatically propagated to the other copies of the people list.

Figure 1:
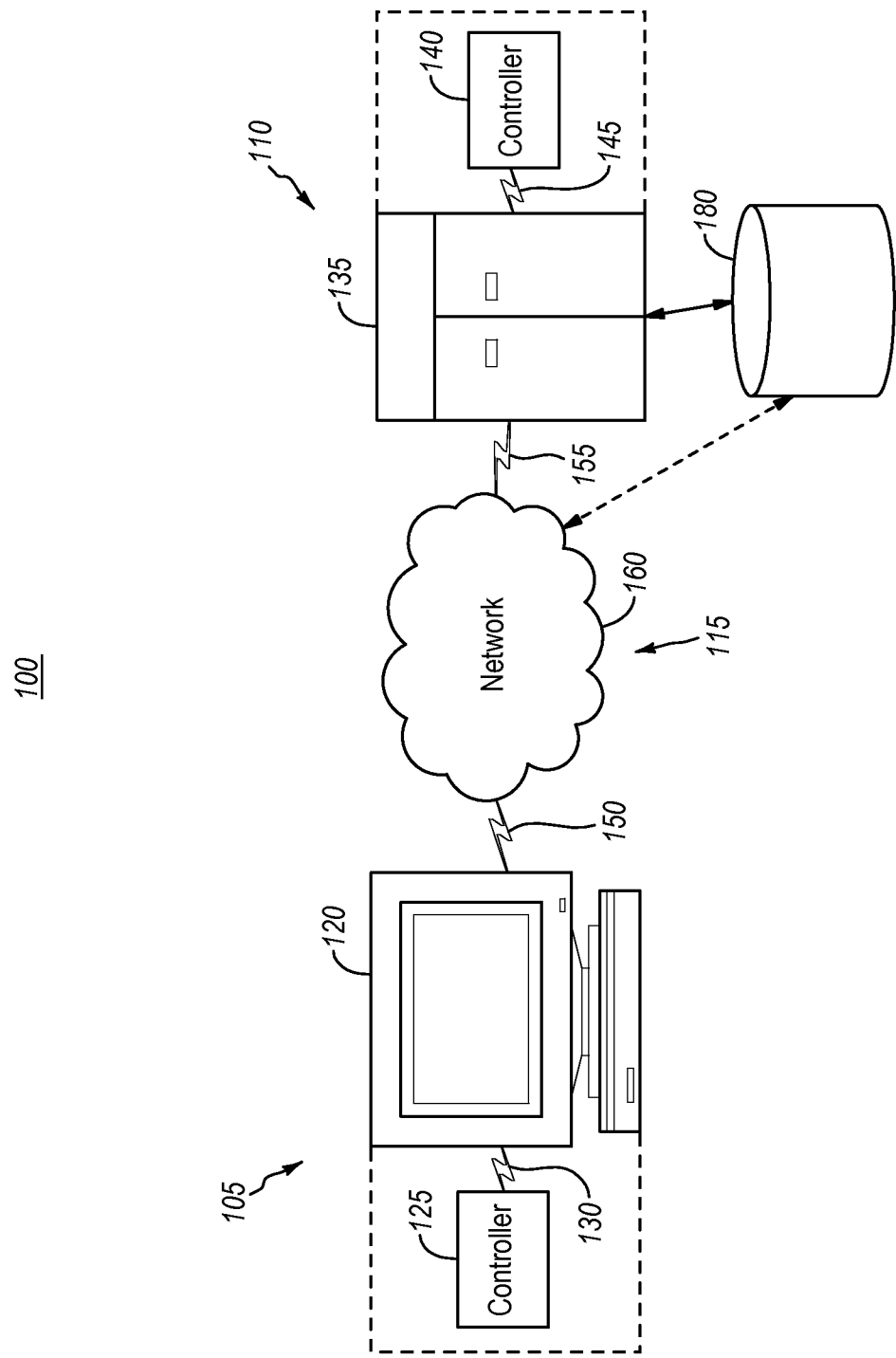
FIG. 1 is a block diagram of a communications system.
Figure 2:
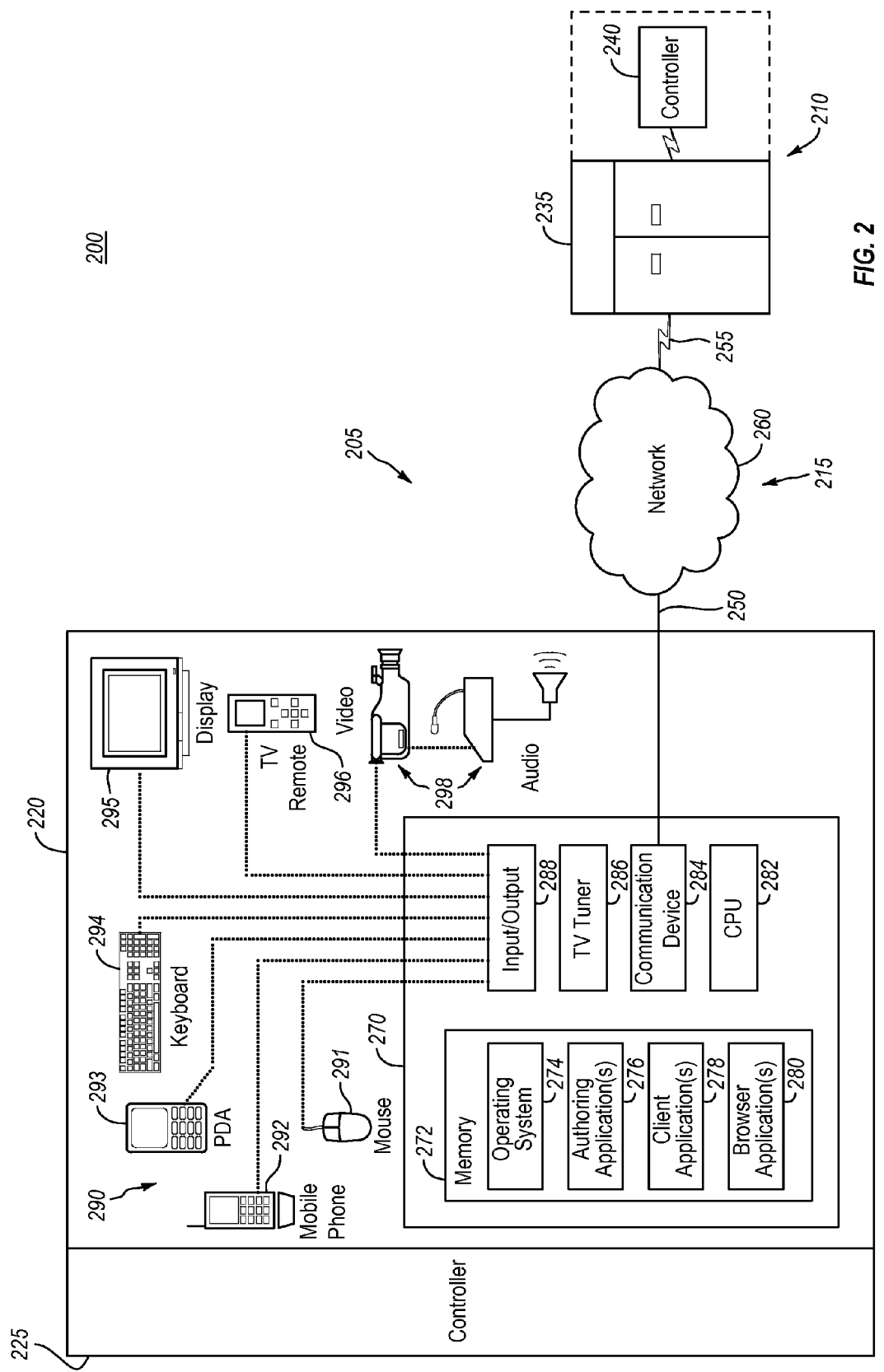
FIGS. 2 and 3 are expansions of the block diagram of FIG. 1.
Figure 3:
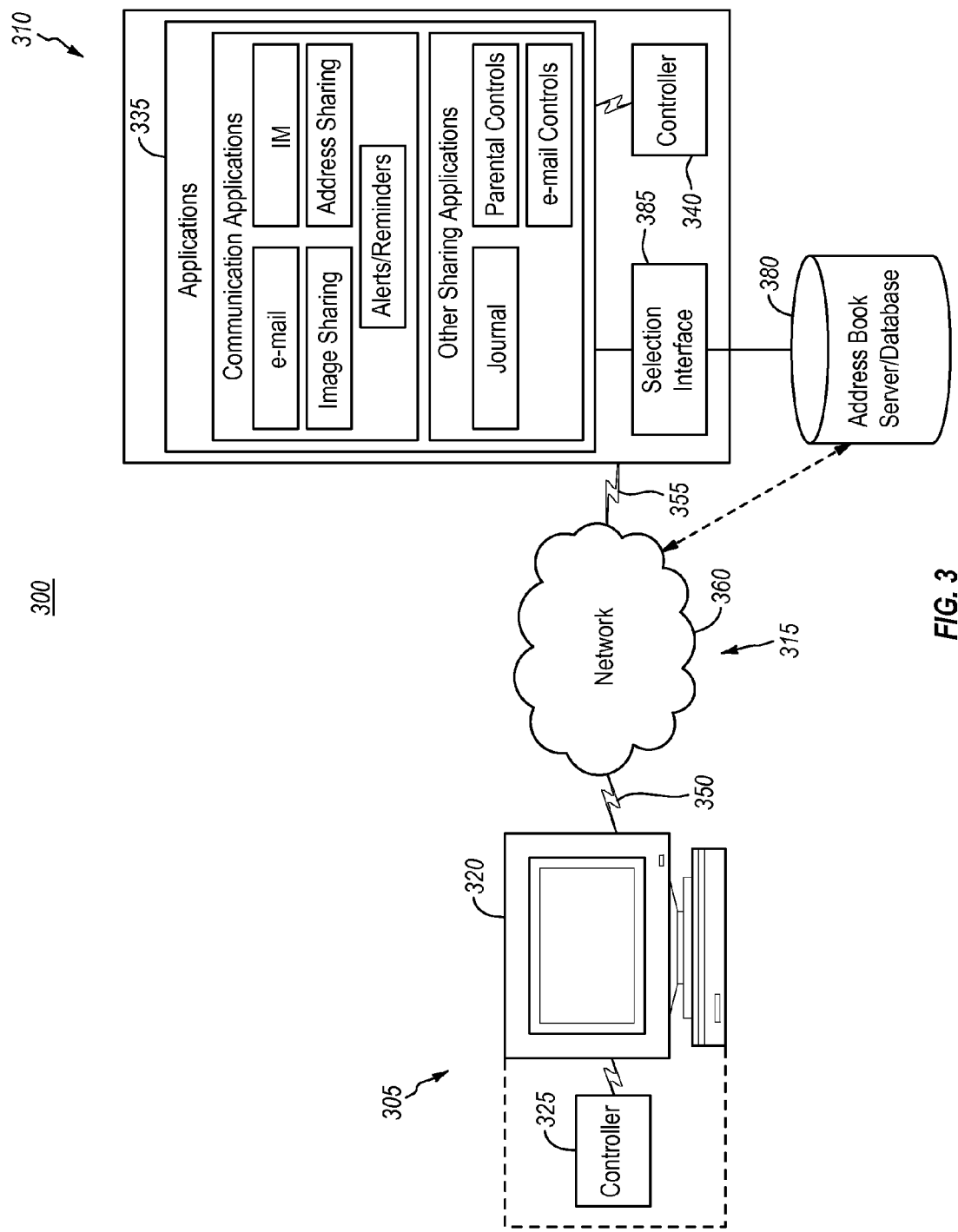

For illustrative purposes, FIGS. 1-3 show an example of a communications system for implementing techniques for transferring electronic data. People lists may be used to address communications sent using the communications system illustrated in FIGS. 1-3. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 1, a communications system 100 is capable of delivering and exchanging data between a requestor system 105 and a provider system 110 through a communications link 115. The requestor system 105 may include a client system and the provider system 110 may include a host system. The requestor system 105 typically includes one or more requestor devices 120 and/or requestor controllers 125, and the provider system 110 typically includes one or more provider devices 135 and/or provider controllers 140. For example, the requestor system 105 or the provider system 110 may include one or more general-purpose computers (e.g., personal computers), one or more special-purpose computers (e.g., devices specifically programmed to communicate with each other and/or the requestor system 105 or the provider system 110), or a combination of one or more general-purpose computers and one or more special-purpose computers. The requestor system 105 and the provider system 110 may be arranged to operate within or in concert with one or more other systems, such as, for example, one or more Local Area Networks ("LANs") and/or one or more Wide Area Networks ("WANs").

The provider system 110 may include a communication interface such as an electronic mail gateway. For instance, the provider system 110 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 110 enables communications between the provider system 110 and other systems through, for example, communications link 115.

The requestor device 120 (or the provider device 135) is generally capable of executing instructions under the command of a requestor controller 125 (or a provider controller 140). The requestor device 120 (or the provider device 135) is connected to the requestor controller 125 (or the provider controller 140) by a wired or wireless data pathway 130 or 145 capable of delivering data.

The requestor device 120, the requestor controller 125, the provider device 135, and the provider controller 140 each typically include one or more hardware components and/or software components. An example of a requestor device 120 or a provider device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The requestor device 120 and the provider device 135 may include devices that are capable of peer-to-peer communications.

An example of a requestor controller 125 or a provider controller 140 is a software application loaded on the requestor device 120 or the provider device 135 for commanding and directing communications enabled by the requestor device 120 or the provider device 135. Other examples include a program, a piece of code, an instruction, a device, a computer, a computer system, or a combination thereof, for independently or collectively instructing the requestor device 120 or the provider device 135 to interact and operate as described. The requestor controller 125 and the provider controller 140 may be embodied permanently or temporarily in any type of machine, component, physical or virtual equipment, storage medium, or propagated signal capable of providing instructions to the requestor device 120 or the provider device 135.

The communications link 115 typically includes a delivery network 160 making a direct or indirect communication between the requestor system 105 and the provider system 110, irrespective of physical separation. Examples of a delivery network 160 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

An electronic information store 180 may be connected to the provider system 110, included as a component of the provider system 110, and/or connected to the delivery network 160. The electronic information store 180 may be a repository for electronic information that may be in an indexed and/or searchable format.

FIG. 2 illustrates a communications system 200 including a requestor system 205 communicating with a provider system 210 through a communications link 215. Requestor system 205 typically includes one or more requestor devices 220 and one or more requestor controllers 225 for controlling the requestor devices 220. Provider system 210 typically includes one or more provider devices 235 and one or more provider controllers 240 for controlling the provider devices 235. The communications link 215 may include communication pathways 250 and 255 that enable communications through the one or more delivery networks 260.

Examples of each element within the communications system of FIG. 2 are broadly described above with respect to FIG. 1. In particular, the provider system 210 and communications link 215 typically have attributes comparable to those described with respect to the provider system 110 and the communications link 115 of FIG. 1. Likewise, the requestor system 205 of FIG. 2 typically has attributes comparable to and illustrates one possible implementation of the requestor system 105 of FIG. 1.

The requestor device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, calendar programs, or graphics programs) capable of generating documents or other electronic content; client applications 278 (e.g., stand alone e-mail client or AOL client, CompuServe client, AIM client, AOL TV client, or ISP client, all of which may include a built-in or embedded e-mail and/or instant messaging client) capable of communicating with other computer users, accessing various computer resources, and viewing, creating, or otherwise manipulating electronic content; browser applications 280 (e.g., Netscape's Navigator or Microsoft's Internet Explorer) capable of rendering standard Internet content and also capable of supporting a web-based e-mail and/or instant messaging client; and other applications such as a digital image sharing application.

The general-purpose computer 270 also includes a central processing unit 282 (CPU) for executing instructions in response to commands from the requestor controller 225. In one implementation, the requestor controller 225 includes one or more of the application programs installed on the internal or external storage 272 of the general-purpose computer 270. In another implementation, the requestor controller 225 includes application programs stored in and performed by one or more device(s) external to the general-purpose computer 270.

The general-purpose computer also includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving television programming in the form of broadcast, satellite, and/or cable TV signals. As a result, the requestor device 220 can selectively and/or simultaneously display network content received by communications device 284 and television programming content received by the TV tuner 286.

The general-purpose computer 270 typically includes an input/output interface 288 for wired or wireless connection to various peripheral devices 290. Examples of peripheral devices 290 include, but are not limited to, a mouse 291, a mobile phone 292, a personal digital assistant 293 (PDA), a MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the requestor device 220. For example, the mobile phone 292 or the PDA 293 may include computing and networking capabilities and function as a requestor device 220 by accessing the delivery network 260 and communicating with the provider system 210. Furthermore, the requestor system 205 may include one, some or all of the components and devices described above.

FIG. 3 illustrates a communications system 300 including a requestor system 305 communicating with a provider system 310 through a communications link 315. The requestor system 305 typically includes one or more requestor devices 320 and one or more requestor controllers 325 for controlling the requestor devices 320. Provider system 310 typically includes one or more provider devices 335 and one or more provider controllers 340 for controlling the provider devices 335. The communications link 315 may include communication pathways 350 and 355 that enable communications through the one or more delivery networks 360.

Examples of each element within the communications system of FIG. 3 are broadly described above with respect to FIG. 1. In particular, the requestor system 305 and communications link 315 typically have attributes comparable to those described with respect to the requestor system 110 and the communications link 115 of FIG. 1. Likewise, the provider system 310 of FIG. 3 typically has attributes comparable to and illustrates one possible implementation of the provider system 110 of FIG. 1.

The provider device 335 typically includes or enables access to one or more applications. The applications may be used to deliver or control messages sent and received by users of the requestor devices 320. The applications may be categorized into two groups: communications applications used to send and receive messages and other sharing applications. Examples of communications applications include an e-mail application, an instant messaging application, a digital image sharing application, an application for sharing contact information, and an application for sending alerts and reminders. Examples of other sharing applications include an e-mail filtering application, an application for specifying parental controls over a parental account, and an electronic journal application. Other applications capable of controlling communications also may be included in the provider device 335. The users of the requestor system 305 use the requestor devices 320 to create messages, and the created messages are given to the applications included in the provider device 335 for delivery.

The applications included in the provider device 335 are capable of executing instructions in response to commands from the provider controller 340. In one implementation, the provider controller 340 includes one or more of the application programs installed on the provider device 335. In another implementation, the provider controller 340 includes application programs stored in and performed by one or more device(s) external to the provider device 335.

An address book server and database 380 may be connected to the provider system 310, included as a component of the provider system 310, and/or connected to the delivery network 360. The address book server and database 380 is broadly described above with respect to FIG. 1. The address book server and database 380 typically has attributes comparable to and illustrates one possible implementation of the electronic information store 180 of FIG. 1. The address book server and database 380 may be a repository for contact information that may be in an indexed and/or searchable format. The address book server and database 380 may store pairs of names and identifiers for individual contacts as well as for people lists. The identifiers stored by the address book server and database 380 may be used to address messages delivered by the applications included in the provider device 385, where the identifiers to be used may be selected through selection of the corresponding names stored in the address book server and database 380.

In one exemplary implementation, a selection interface 385 is included in the provider system 310 to facilitate the selection of names and, consequently, identifiers from the address book server and database 380. The selection interface 385 enables the selection of names from the address book. The message to be delivered is thereby addressed to the identifiers corresponding to the names selected in the selection interface 385. After the message is addressed, it is delivered to the specified recipients by the appropriate application from the provider device 335.

Alternatively or additionally, the selection interface 385 and the applications may be included in the requestor system 305 so that the recipients of the message to be sent may be specified before the message is given to the applications included in the provider device 335 for delivery. When the selection interface 385 is included in the requestor system 305, the contents of the address book server 380 may be accessed and/or transferred over the communications link 315 to the requestor system 305, where the contents are displayed by the selection interface 385. The applications included in the provider device 335 may immediately deliver a message to the recipients that have been specified through the selection interface 385 included in the requestor system 305. In addition or alternatively, the address book server and database 380 and the selection interface 385 may be included in the requestor system 305.

The majority of the activity of the communications system illustrated in FIGS. 1-3 involves the communication and sharing of messages and information. The users of the communications system 100, 200, or 300 may send various kinds of information to one another, including e-mail messages, instant messages, digital images, address information, and alerts or reminders. Typically, a different application exists for using the communications system 100, 200, or 300 to send each type of message. Within each application, a user may actively specify a list of people with which communications regularly occur using that application.

People lists are lists of identifiers of people to whom messages may be sent. People lists represent filtered versions of a single list of contacts with whom a user communicates. The identifiers included in a people list are used to address messages to the people corresponding to the identifiers when the people list that includes the identifiers is chosen. People lists may be stored in an address book or in some other central repository that may be accessed by multiple applications.

Each of the applications may access the central repository of people lists when addressing a message. One or more people lists may be chosen as a recipient of the message, and the message is sent to the people corresponding to the identifiers in the people list. In this way, people lists function in the same way as e-mail addresses or screen names in that people lists are used to specify the recipients of a message. Several applications access the same central repository of people lists, so specification of people lists only needs to occur in one place at one time. Additionally or alternatively, all or a portion of the central repository of people lists may be communicated to a local device (e.g., requestor device 120, 220, or 320) for access and use by the applications on the local device. In one exemplary implementation, the people lists may be transferred to the local device for a temporary duration. Any changes to the people lists while on the local device including any additions, deletions, and edits, may be communicated to the central repository of people lists such that the central repository of people lists is updated.

In some applications, people lists may be used to specify the recipients of a message or some other form of shared information. For example, a people list may be used in an e-mail application to specify the direct recipients, the carbon copied recipients, or the blind carbon copied recipients of an e-mail message. A people list may be used by an instant messaging application to address an instant message that is broadcast simultaneously to multiple people. A people list may specify the recipients of images shared through use of a digital image sharing application. A people list may specify the contacts that receive address information and updates to the address information that are sent by an address sharing application. Finally, people lists may indicate the contacts that are sent alerts and reminders from an alerting application.

In addition, people lists may be used as access control lists. For example, a people list may be used by an e-mail filtering application to specify the contacts from which e-mail messages are accepted. Messages from contacts included in the people list may be accepted, while messages from people not included in the people list may be blocked. On the other hand, a people list may be used by the e-mail filtering application to specify the contacts from which e-mail messages are blocked. In this case, messages from contacts included in the people list may be blocked while messages from contacts not included in the people list may be accepted. A similar behavior may be implemented by an application through which parental controls over a child account are specified. People lists may be used to specify contacts from which communications are accepted or rejected by the child account, as the case may be. Similarly, people lists may be used by an electronic journal application to specify the contacts that are allowed or disallowed access to the electronic journal.

A single people list may be used by multiple applications to address multiple kinds of messages. For example, a single people list may be used to address an instant message sent by an instant messaging application, as well as specify the recipients of a set of shared images from a digital image sharing application. In addition, a single people list may be used to address an e-mail as well as an instant message that is sent to the people contained in the single people list. Moreover, a single people list may be used by a mail filtering application to specify contacts from which e-mails accepted or blocked and also by an application enabling the specification of parental controls over a child account to specify the contacts from which communications are accepted or blocked by the child account. A single people list may be used by any number of communications applications after only a single specification. For example, a single people list may be populated with contacts from whom spam e-mail messages were received in an e-mail application. The list may be used by an e-mail filtering application as well as an application for specifying parental controls to block communications from contacts included in the list.

If an identifier contained in a people list may not be used by a particular application, then the user that chose the people list may be prompted to enter an identifier that may be used by the application. For example, the user may be prompted for an e-mail address of a contact whose cellular phone number is stored in the people list when the people list is being used by an e-mail application. When the user is not prompted for a usable identifier, then the unusable identifier is omitted, and the corresponding contact is not included in the action taken on the people list. Continuing the above example, if the user is not prompted for an e-mail address, then the message being created by the e-mail application is not sent to the contact whose cellular phone number is stored in the people list.

A people list is identified and selected by a name that is unique among the names of the other people lists stored in the central repository. In the event that multiple non-identical people lists are stored within the central repository with the same name, then the names of the conflicting people lists are automatically modified.

People lists may be created manually or automatically. When creating a list manually, a user must specify a name for the people list as well as the identifiers of the people to be included in the people lists. When created automatically, a system may automatically detect a set of people that could include a people list. The system may prompt the user for a name of the automatically detected set of people.

Figure 4:
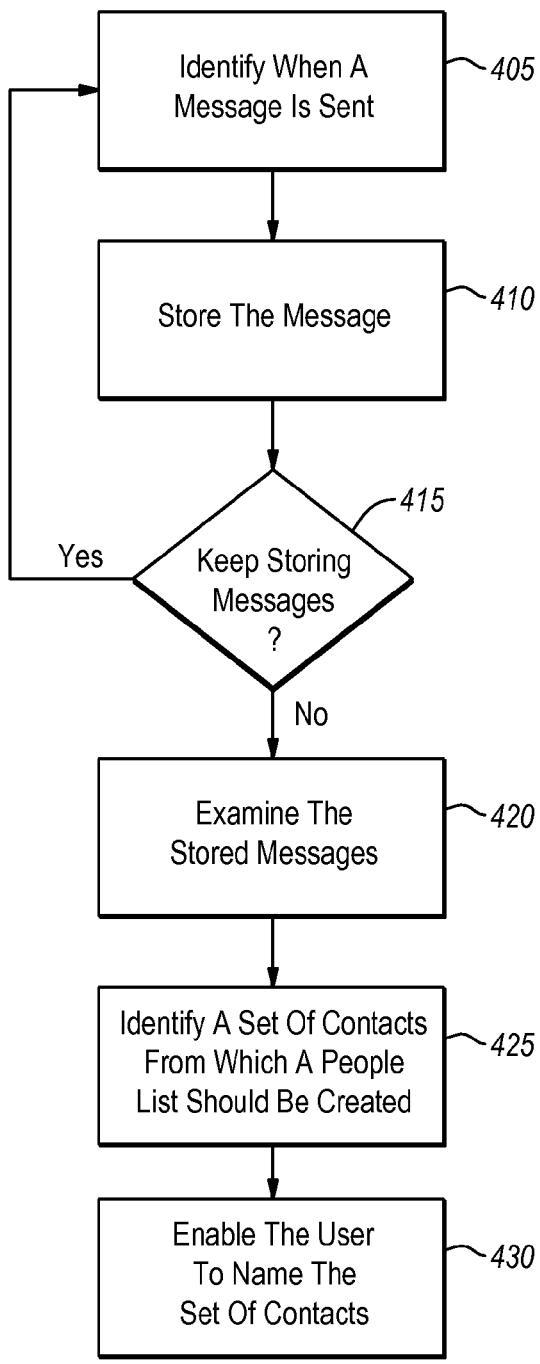
FIGS. 4 and 7 are flow charts of processes for automatically creating and storing a people list.

Referring to FIG. 4, a process 400 for automatically recognizing a set of recipients that have been repeatedly specified as recipients of messages enables the automatic specification of a people list. After a set of contacts are identified as repeated recipients of messages, the set is given a name, and that set becomes a people list that can be used to quickly specify the set of contacts as the recipients of a message in the future. The process 400 monitors the communications sent from at least one application before suggesting that a set of contacts should be formalized into a people list.

The process 400 begins with the monitoring of the messages sent by the various applications. It is identified when a message is sent (405), and the message is stored for later analysis (410). A determination is made as to whether to keep storing messages (415). Messages may be detected and stored for a certain amount of time or until a certain number of messages have been stored. If more messages are to be stored, more messages are identified when sent (405) and stored (410) until no more messages are to be stored (415).

After identifying and storing sent messages, the set of stored messages is analyzed (420). The analysis attempts to identify a sender-specified set of contacts from which a people list may be created (425). The set of contacts typically are identified from the recipients of the stored messages. A variety of criteria may be used to determine if a people list should be created out of a set of contacts grouped by a sender that have repeatedly received messages. For example, one criterion may dictate that a certain percentage of the total messages sent be addressed to the set of contacts before the sender-specified set of contacts is identified as a candidate for a people list. Alternatively, a certain number of messages may need to be sent to the set of recipients within a certain amount of time before the set of contacts is made into a people list. The application that sent the messages may influence whether a set of contacts is made into a people list. For example, if a set of contacts is sent two e-mail messages, then the set of contacts may be made into a people list, but if a set of contacts is sent two images from a digital image sharing application, then the set of contacts may not be made into a people list. Other criteria are possible, and combinations of criteria may be used to determine if the set of contacts should be made into a people list. For example, a certain percentage of e-mail messages and a certain frequency of instant messages sent to the set of contacts may be required before the set of contacts is made into a people list. In these cases, the sets of contacts from which a people list may be generated are created by the sender of the stored messages and are not created as a result of the analysis of the stored messages.

For example, consider that the e-mail messages sent and digital images shared by a user are stored for a two-week period. The analysis of the stored e-mail messages reveals that the user addressed five e-mail messages to a specific set of contacts during the two-week period. The analysis may suggest that the set of contacts is converted into a people list. The analysis also may reveal that the user specified a group of contacts with which ten digital images were shared, which may lead to the suggestion that the group of contacts be converted into a people list. Similarly, if two e-mail messages and six digital images are sent to a user-specified group of contacts, the group of contacts may be identified as a candidate for a people list.

When a set of contacts is identified for conversion into a people list, the user is prompted to give a name to the set of contacts to formally create a people list including the set of contacts (430). The user also may choose to reject the conversion of the identified set of contacts into a people list. In doing so, the user also may choose to delay the later suggestion that the identified set of contacts be converted into a people list. When a set of contacts is identified for conversion into a people list, the set of contacts has been used a requisite amount. The next time the set of contacts is used, the set of contacts still will have been used the requisite amount. In one implementation, delaying the later suggestion that the set of contacts be converted into a people list may include removing from memory all previous uses of the set of contacts. In another implementation, delaying the later suggestion may include increasing the requisite amount of use of the set of contacts that triggers the suggestion to the user that the set of contacts be converted to a people list.

People lists also may be created automatically through integration from other applications. For example, the groups within a buddy list from an instant messaging application may be used to specify people lists within the central repository. Similarly, e-mail address lists stored within an e-mail application may be integrated into the central repository as people lists. After integration, the lists in the applications from which the people lists were created may be connected to the people lists such that any changes made to the people lists are automatically reflected in the applications, and vice versa. For example, any changes made to a group in a buddy list of an instant messaging application may be reflected in the corresponding people list, and vice versa. Options also may exist for importing people lists from the central repository into, for example, the buddy list, as new groups.

After creation, people lists may be shared with others. A copy of the people list to be shared is sent to each of the people with whom the list is to be shared. Whenever a change is made to the people list, the shared copies of the people list are updated to reflect the change. People lists may be changed through use of an interface that displays the members of the people lists contained within the central repository and enables the addition and deletion of identifiers from the people lists.

Once specified, people lists also may be used to address messages sent by the communications applications. When creating a message within a communications application, an interface for selecting people lists as recipients of the message may be displayed. The interface includes a list of available people lists and contacts to whom the message may be sent. Selecting the people lists or contacts in the lists addresses the message to the selected people lists or contacts. People lists also may be modified within the selection interface. People lists also may be suggested automatically as recipients of the message based on a determination that the identifiers included in the people list may be the intended recipients of the message.

Figure 5:
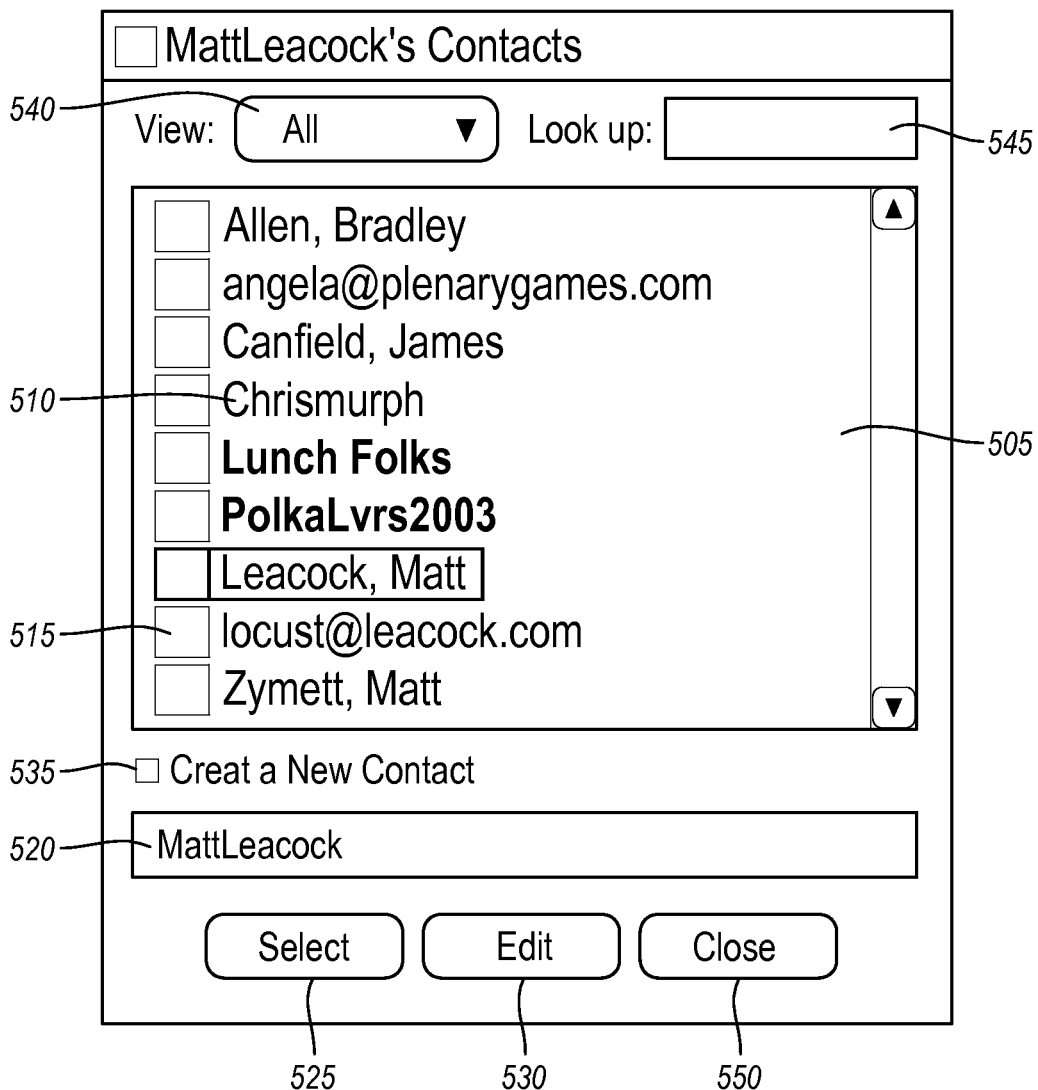
FIG. 5 is an illustration of an interface for selecting people or groups of people to whom a message is sent.

Referring to FIG. 5, a selection interface 500 enables the selection of people lists as recipients of messages sent by multiple applications. Each of the applications displays the selection interface 500 to enable specification of the recipients of a message sent by the particular application. For example, an e-mail application accesses the selection interface 500 to allow the user to specify the recipients of an e-mail message. The selection interface 500 also may be used to create new and modify existing people lists. The new or modified people lists may be selected as recipients of the message for which the selection interface 500 was displayed.

The selection interface 500 includes a contact list 505 that includes the possible recipients of a message for which the selection interface 500 was displayed. The possible recipients may be single contacts or people lists that include multiple contacts. Each of the contacts or people lists is listed in the contact list 505 by a name 510. The name 510 may be the name of a single contact or the name of a people list. Beside each name 510 is an icon 515 that indicates what is referred to by the corresponding name 510. For example, a particular icon 515 may be placed next to the name of a people list, while a different icon may be placed next to the name of a single contact. The icons 515 allow the user of the selection interface 500 to visually distinguish between the types of contacts included in the contact list 515.

After a contact has been selected from the contact list 505, information about the selected contact is placed within the details text field 520. The details text field 520 displays the information that will be entered on the message for which the selection interface 500 was displayed. If a single contact is selected, then a single identifier of the selected contact is listed in the details text field 520. For example, in the illustrated selection interface 500, the single contact named "Leacock, Matt" has been selected, and the identifier "MattLeacock" is listed in the details text field 520. If a people list is selected, then identifiers of all of the contacts included in the people list are listed in the details text field 520. If an identifier or identifiers is missing for a selected contact or people list, the details text field 520 is left empty. If more than one contact or people list is selected from the contact list 505, then the details text field 520 is left empty.

Selecting a select button 525 after one or more contacts or people lists have been selected enters the identifiers of the selected contacts or people lists in the message. The application determines where the recipient information is located within the message. After to the select button 525 is selected, any selected names in the contact list 505 are deselected. Alternatively or additionally, pressing the enter key on the keyboard may enter the identifiers of the selected contacts of people lists in the message and deselect the selected names.

Selected contacts and people lists also may be edited using the selection interface 500. Selecting on an edit button 530 creates an interface for modifying a selected contact or people list. If a contact is selected, an interface for modifying the identifier associated with the contact is displayed. If a people list is selected, an interface for adding, deleting, or modifying identifiers in the selected people list is presented. If more than one contact or people list is selected, then a message indicating that only one contact or people list may be edited at a time is displayed.

Similarly, contacts and people lists may be created using a creation button 535. Pressing the creation button 535 displays an interface for creating a new contact or people list. In either case, a name may be entered for the new contact or people list. If a new contact is being specified, then a single identifier is entered on the interface to correspond to the entered name. If a people list is being specified, then multiple identifiers are entered on the interface. The new contact or people list is added to the contact list 505 after full specification in the interface for creating a new contact or people list.

In one exemplary implementation, selected contacts and people lists may be edited by mousing-over a particular contact or people list causing an interface to be presented for adding, deleting, or modifying identifiers.

The contact list 505 may be filtered to include only a subset of the available contacts or people lists using a filter selection box 540. The name of a category of contacts or people lists may be selected from the filter selection box 540. Only those contacts or people lists belonging to the category selected in the filter selection box 540 are included in the contact list 505. For example, in the illustrated selection interface 500, the default category "All" is selected in the filter selection box 540, so all of the available contacts are listed in the contact list 505. The listed contacts or people lists may then be selected as recipients of the message corresponding to the selection interface 500.

A user may search the contact list 505 using a search text field 545. Any contacts or people lists in the category selected in the filter selection box 540 with a name that matches the text entered into the search text field 545 is listed in the contact list 505. The listed contacts or people lists may then be selected as recipients of the message corresponding to the selection interface 500. After all recipients of the message have been selected and all changes to the set of contacts and people lists have been made, the selection interface 500 may be dismissed through use of a close button 550.

People lists may be acted upon in ways other than selection as recipients of messages created by applications. For example, people lists may be printed. When a people list is printed, the identifiers included in the people lists are printed.

The permissions of all contacts within a people list are automatically set to be the same, and setting permissions for a people list sets permissions for each of the contacts included in the people list. For example, all the contacts within a people list have the same level of access (i.e., read only or read and write) to an electronic journal to which the people list was given access. Moreover, when contacts are added to a people list, the permissions for the newly added contacts are set to be the same as the existing permissions of the other contacts included in the people list.

The central repository may store multiple people lists, and a particular identifier of a person may appear in multiple people lists stored within the central repository. The central repository also may include empty people lists that do not include any identifiers of people. However, a people list may not include another people list (i.e., nested people lists are not permitted). Limits may be placed on the maximum number of identifiers that may be placed within a single people list, as well as the maximum number of people lists that may be stored within the repository.

Figure 6:
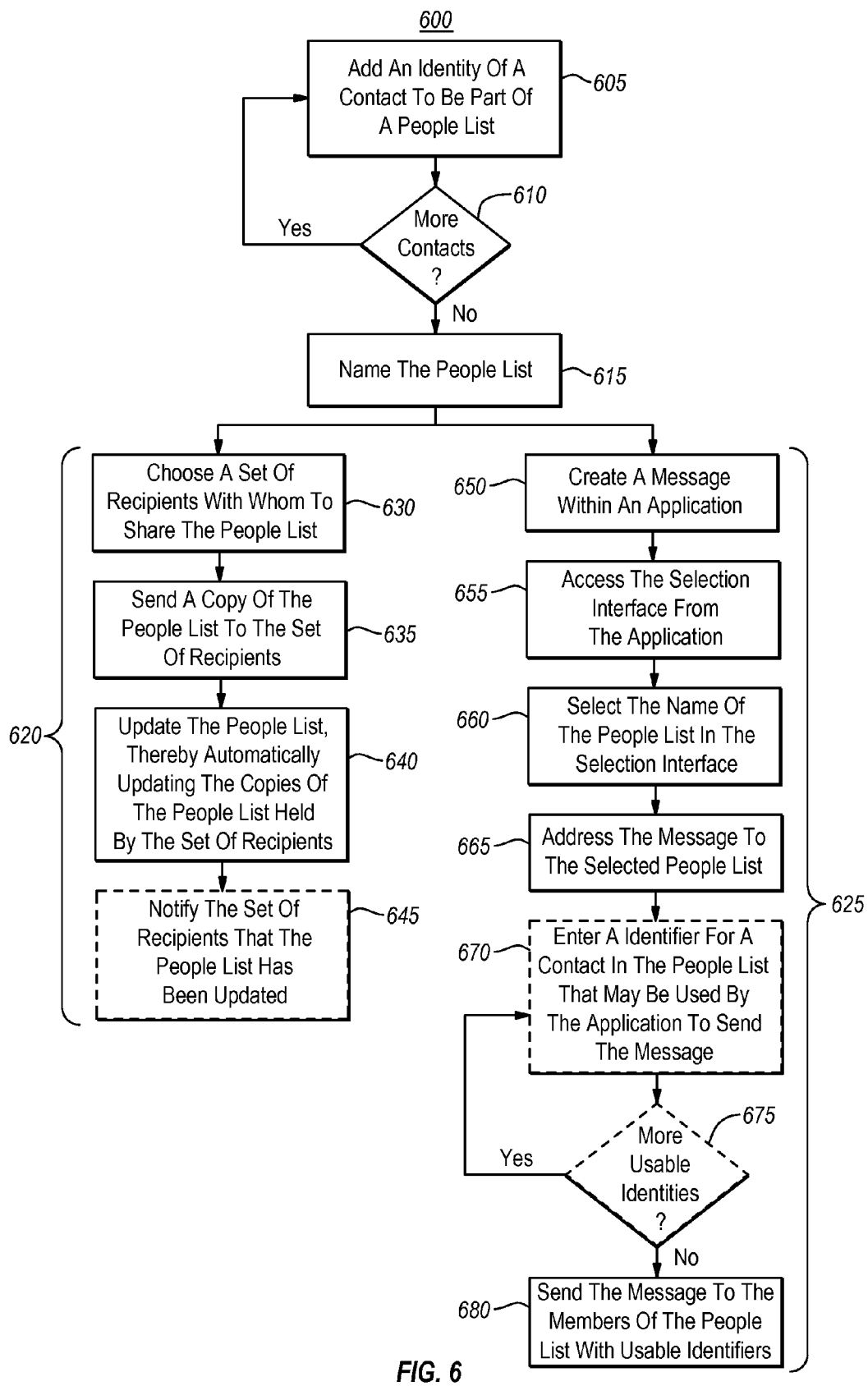
FIG. 6 is a flow chart of specifying, sharing, and using people lists.

Referring to FIG. 6, a process 600 is performed to specify, share and use a people list. The process 600 enables the specification of a group of contacts to be used to address communications sent from multiple applications. Sharing the group enables multiple users to use the group of contacts to address communications sent from multiple applications.

The process 600 begins with the specification of a people list. An identifier of a contact is added to the people list (605). A check is made as to whether more contacts are to be added to the people list (610). If so, then an identifier of another contact is added to the people list (605). In this manner, an identifier for each of the contacts to be included in the people list is added to the people list. Once a determination is made that no more contacts are to be added to the group (610), the group is given a name (615), thus completing the specification of the people list.

After the people list has been specified, it may be used or shared. Branch 620 illustrates a sub-process for sharing a people list, while branch 625 illustrates a sub-process for using a people list. The sub-processes illustrated by branches 620 and 625 are not mutually exclusive in that both may occur. In addition, the sub-processes illustrated by branches 620 and 625 may be performed in any order. Moreover, the sub-processes illustrated by branches 620 and 625 may be repeated any number of times after the people list has been specified.

To share the people list, a sub-process illustrated by branch 620 is performed. A set of recipients with whom the people list is to be shared is chosen (630). A copy of the people list is sent to each of the recipients (635). Each of the recipients stores the people list and may then use the people list to address messages sent by multiple applications without having to specify the people list themselves. The people list may be modified by adding one or more contacts to the list, deleting one or more contacts from the list, or modifying the identifier of one or more of the contacts already contained in the list (640). Making changes to the people list locally causes the same changes to be made automatically to the copies of the people lists that are stored by the set of recipients. Each of the recipients optionally may be notified that each copy of the people list has been updated to reflect the changes made to the original copy of the people list (645). If one of the recipients makes changes to the people list, the changes also may be propagated to the other copies of the people list, including the original copy.

To use the people list, a sub-process illustrated by branch 625 is performed. A message is created using one of the applications (650). In order to specify the recipients of the message, an interface for selecting contacts or people lists, such as the selection interface 500 from FIG. 5, is accessed (655). The name of the people list is selected using the interface (660), and the identifiers corresponding to the selected people picker are used to address the message (665).

The identifiers corresponding to the people list may not be able to be used by the application to address the message. For example, the people list may include an instant messaging screen name as an identifier, which cannot be used to address an e-mail. In this case, an identifier that can be used by the application optionally may be entered for a contact in the list (670). A determination may be made as to whether the people list includes more identifiers that cannot be used to address the message sent by the application. (675). If so, an identifier that can be used by the application for another contact in the group is entered (670). In this way, all of the identifiers included in the people list that cannot be used by the application to address the message may be replaced with identifiers that may be used to address the message. Instead of prompting for usable identifiers, the application may simply omit the contacts included in the people list with an identifier that cannot be used and not send those contacts the message.

After the recipients of the message have been specified as the contacts included in the people list, the message is sent to those contacts (680). The choice of the members of the people list as the recipients of the message was independent of the application to send the message. The people list may be used to address a message sent by any application after a single specification.

Figure 7:
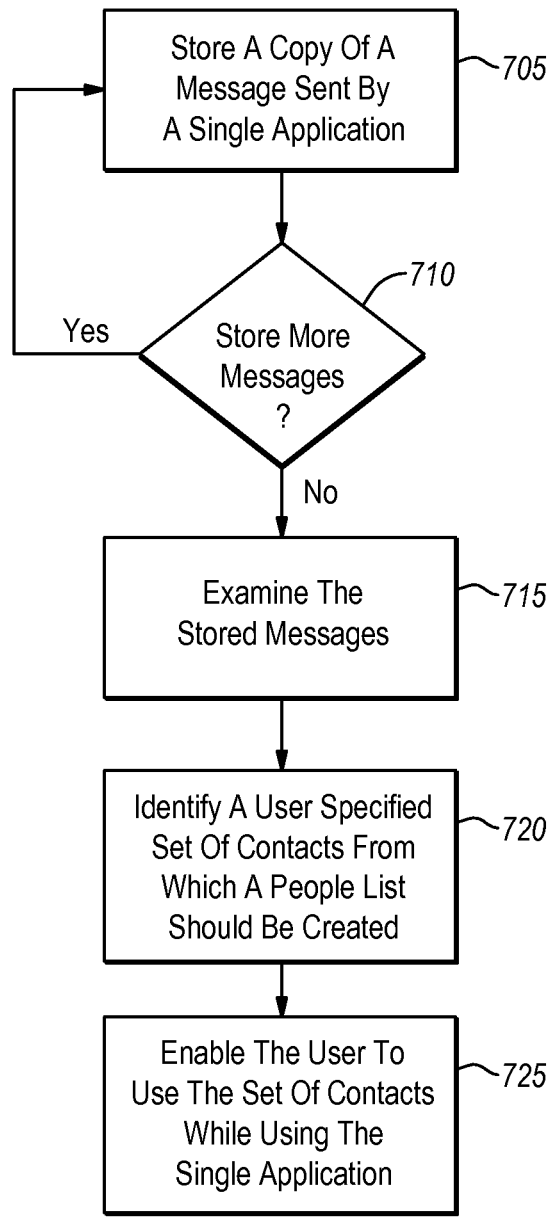

Referring to FIG. 7, a passive people list specification process 700 may be used in an environment local to a user of a single application to examine communications sent from the single application. The process 700 may identify groups of contacts specified by the user of the single application from which a people list may be created. The process 700 may be executed on a client device, such as the requestor system 105 from FIG. 1 and may be included as part of the single application. Two copies of messages sent from the single application are made. One copy of each message is stored locally for later analysis, and another copy is forwarded to a host system, such as the provider system 110 from FIG. 1, for delivery (705). A determination is made as to whether more messages should be stored (710). For example, messages may be stored for a certain amount of time or until a certain number have been stored. If enough messages have not been stored, copies of other messages sent by the single application are stored locally (705) until a determination is made that enough messages have been stored (710). At that point, the set of stored messages is examined (715). The analysis of the stored messages attempts to identify one or more user specified sets of contacts from which a people list may be created (720).

A variety of criteria may be used to determine if a people list should be created out of a set of contacts grouped by a sender that have repeatedly received messages. For example, one criterion may dictate that a certain percentage of the total messages sent be addressed to the set of contacts before the sender-specified set of contacts is identified as a candidate for a people list. Alternatively, a certain number of messages may need to be sent to the set of recipients within a certain amount or shifting window of time before the set of contacts is made into a people list. Other criteria also may be used. In these cases, the sets of contacts from which a people list may be generated are created by the sender of the stored messages and are not created as a result of the analysis of the stored messages.

For example, consider that the single application is an e-mail application and that five of the one hundred stored e-mail messages are addressed to the same user specified group of contacts. The analysis of the stored e-mail messages may suggest that the set of contacts is converted into a people list. As another example, consider that the single application is a digital image sharing application and that ten of the two hundred stored digital images were shared with a particular group of contacts. The analysis may suggest that the particular group of contacts be converted into a people list.

As yet another example, consider that the single application is an electronic journal application and that a journal entry was sent to the same user specified group of contacts each day of the period in which the journal entries were stored. The analysis of the stored journal entries may suggest that the set of contacts is converted into a people list. As yet another example, consider that the single application is an instant messaging application and that an instant message was sent to a user specified group of contacts every five hours every day of the period in which the instant messages were stored. The analysis of the stored instant messages may suggest that the set of contacts is converted into a people list.

As another example, consider that the single application is a contact information sharing application and that an update to contact information was sent to the same user specified group of contacts five times during the two-week period in which the updates were stored. The analysis of the stored updates may suggest that the set of contacts is converted into a people list. As another example, consider that the single application is an alerting application and that an alert was sent to the same user specified group of contacts once a week during the period in which the updates were stored. The analysis of the stored alerts may suggest that the set of contacts is converted into a people list.

When a set of contacts is identified for conversion into a people list, the user is made able to use the set of contacts as a people list while using the single application to send messages (725). Enabling the user to use the set of contacts as a people list may include enabling the user to name the people list created from the set of contacts for easy access and use. Enabling the user to use the set of contacts as a people list also may include enabling the user simply to accept the suggestion that the set of contacts be converted into a people list. The user also may choose to reject the conversion of the identified set of contacts into a people list. In doing so, the user also may choose to delay the later suggestion that the identified set of contacts be converted into a people list. When a set of contacts is identified for conversion into a people list, the set of contacts has been used a requisite amount. The next time the set of contacts is used, the set of contacts still will have been used the requisite amount. In one implementation, delaying the later suggestion that the set of contacts be converted into a people list may include removing from memory all previous uses of the set of contacts. In another implementation, delaying the later suggestion may include increasing the requisite amount of use of the set of contacts.

Alternatively, local processes may be invoked to implement the features described with respect to the hosted implementations of FIGS. 4, 5, 6, and 7.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components.

For example, with respect to the passive people list specification process 700 described above in FIG. 7, instead of storing a copy of a message for later analysis regarding the set of contacts, the process simply may store just the set of contacts for later analysis and not a copy of the entire message. As other sets of contacts from other messages are stored, then a comparison may be performed to identify repeat usage of the same set of contacts in a message to make a suggestion to the user whether a people list may be created for this set of contacts.

Furthermore, people lists may be created/suggested for specific aspects of a user environment or subsets of the sharing applications, or they may be globally created/suggested.

Accordingly, other implementations are within the scope of the following claims.

What is claimed is:

1. A method comprising:
    maintaining a contacts list that includes a plurality of contacts for a user of a first communication program;
    determining one or more contacts from the plurality of contacts included in the contacts list are supported by a second communication program;
    creating an additional contacts list that comprises the one or more contacts from the plurality of contacts that are determined as supported by the second communication program;
    providing the additional contacts list to the second communication program;
    recognizing, by at least one processor and based on detecting user input within the first communication program, a modification to the contacts list that modifies a contact supported by the second communication program;
    modifying, by the at least one processor, the additional contacts list based on the recognized modification; and
    providing the modified additional contacts list to the second communication program.

2. The method of claim 1, wherein modifying the additional contacts list comprises adding or removing the contact supported by the second communication program to the additional contact list.

3. The method of claim 1, wherein recognizing the modification to the contacts list comprises detecting user input within the first communication program that updates contact information associated with the contact supported by the second communication program.

4. The method of claim 1, wherein recognizing the modification to the contacts list comprises detecting user input within the first communication program that groups together a plurality of contacts within the contacts list.

5. The method of claim 1, wherein the first communication program is associated with a first electronic device and the second communication program is associated with a second electronic device.

6. The method of claim 1, wherein the first communication program and the second communication program are associated with a first electronic device.

7. The method of claim 1, further comprising maintaining the contacts list in a central repository accessible to the first communication program and the second communication program.

8. The method of claim 1, wherein the first communication program is associated with one of an email program, an instant messaging program, a digital image sharing program, a contact information sharing program, or a program for sending alerts and reminders.

9. The method of claim 1, wherein the first communication program and the second communication program are associated with instant messaging programs.

10. The method of claim 1, further comprising:
recognizing user input modifying a second contact included in the additional contacts list in the second communication program; and
updating the contacts list within the first communication program to reflect the recognized modified second contact.

11. The method of claim 1, wherein each contact of the plurality of contacts included in the contacts list is identified using an identifier.

12. The method of claim 1, wherein the first communication program is associated with a program located on a mobile device.

13. A non-transitory computer-readable storage medium storing instructions that, when executed by at least one processor, cause a computer system to:
maintain a contacts list that includes a plurality of contacts for a user of a first communication program;
determine one or more contacts from the plurality of contacts included in the contacts list are supported by a second communication program;
create an additional contacts list that comprises the one or more contacts from the plurality of contacts that are determined as supported by the second communication program;
provide the additional contacts list to the second communication program;
recognize, based on detecting user input within the first communication program, a modification to the contacts list that modifies a contact supported by the second communication program;
modify the additional contacts list based on the recognized modification; and
provide the modified additional contacts list to the second communication program.

14. The computer-readable storage medium of claim 13, wherein the instructions, when executed by the at least one processor, cause the computer system to modify the additional contacts list comprises adding or removing the contact supported by the second communication program to the additional contact list.

15. The computer-readable storage medium of claim 13, wherein the instructions, when executed by the at least one processor, cause the computer system to recognize the modification to the contacts list by detecting user input within the first communication program that updates contact information associated with the contact supported by the second communication program.

16. The computer-readable storage medium of claim 13, wherein the instructions, when executed by the at least one processor, cause the computer system to recognize the modification to the contacts list by detecting user input within the first communication program that groups together a plurality of contacts within the contacts list.

17. An apparatus comprising:
at least one processor; and
at least one non-transitory computer readable storage medium storing instructions that, when executed by the at least one processor, cause the apparatus to:
maintain a contacts list that includes a plurality of contacts for a user of a first communication program;
determine one or more contacts from the plurality of contacts included in the contacts list are supported by a second communication program;
create an additional contacts list that comprises the one or more contacts from the plurality of contacts that are determined as supported by the second communication program;
provide the additional contacts list to the second communication program;
recognize, based on detecting user input within the first communication program, a modification to the contacts list that modifies a contact supported by the second communication program;
modify the additional contacts list based on the recognized modification; and
provide the modified additional contacts list to the second communication program.

18. The apparatus of claim 17, wherein the instructions, when executed by the at least one processor, cause the apparatus to modify the additional contacts list comprises adding or removing the contact supported by the second communication program to the additional contact list.

19. The apparatus of claim 17, wherein the instructions, when executed by the at least one processor, cause the apparatus to recognize the modification to the contacts list by detecting user input within the first communication program that updates contact information associated with the contact supported by the second communication program.

20. The apparatus of claim 17, wherein the instructions, when executed by the at least one processor, cause the apparatus to recognize the modification to the contacts list by detecting user input within the first communication program that groups together a plurality of contacts within the contacts list.

* * * * *